United States Patent
Rock et al.

(10) Patent No.: US 7,794,890 B2
(45) Date of Patent: Sep. 14, 2010

(54) ALIGNING METHOD FOR REPEATING AND NON-REPEATING UNITS IN A FUEL CELL STACK

(75) Inventors: Jeffrey A. Rock, Fairport, NY (US); Benno Andreas-Schott, Pittsford, NY (US); Thomas P. Migliore, Rochester, NY (US); Ivan D. Chapman, Victor, NY (US); Matthew J. Beutel, Webster, NY (US); Mark W. Keyser, Bloomfield, NY (US)

(73) Assignee: GM Global Technology Operations, Inc.

( * ) Notice: Subject to any disclaimer, the term of this patent is extended or adjusted under 35 U.S.C. 154(b) by 1415 days.

(21) Appl. No.: 11/215,149

(22) Filed: Aug. 30, 2005

(65) Prior Publication Data
US 2006/0051651 A1    Mar. 9, 2006

Related U.S. Application Data

(60) Provisional application No. 60/606,961, filed on Sep. 3, 2004.

(51) Int. Cl.
*H01M 8/02* (2006.01)
*H01M 8/04* (2006.01)
*H01M 8/24* (2006.01)
*A47F 7/00* (2006.01)

(52) U.S. Cl. .................... 429/452; 429/467; 429/471; 211/49.1

(58) Field of Classification Search .................... None
See application file for complete search history.

(56) References Cited

U.S. PATENT DOCUMENTS

| | | | |
|---|---|---|---|
| 6,358,641 B1 * | 3/2002 | Mease | ................ 429/34 |
| 6,555,267 B1 | 4/2003 | Broman et al. | |
| 2005/0095484 A1 * | 5/2005 | Saulsbury et al. | ......... 429/32 |

* cited by examiner

*Primary Examiner*—Dah-Wei Yuan
*Assistant Examiner*—Angela J. Martin
(74) *Attorney, Agent, or Firm*—Harness, Dickey & Pierce, P.L.C.

(57) ABSTRACT

An alignment system and method for assembling a fuel cell stack. Components of the fuel cell stack have internal alignment features and are aligned to a predetermined orientation during assembly. The system and method allow fuel cell stacks to be assembled within high tolerance levels while improving access to each component during assembly. Additionally, the system and method can provide additional rigidity to a fuel cell stack.

18 Claims, 20 Drawing Sheets

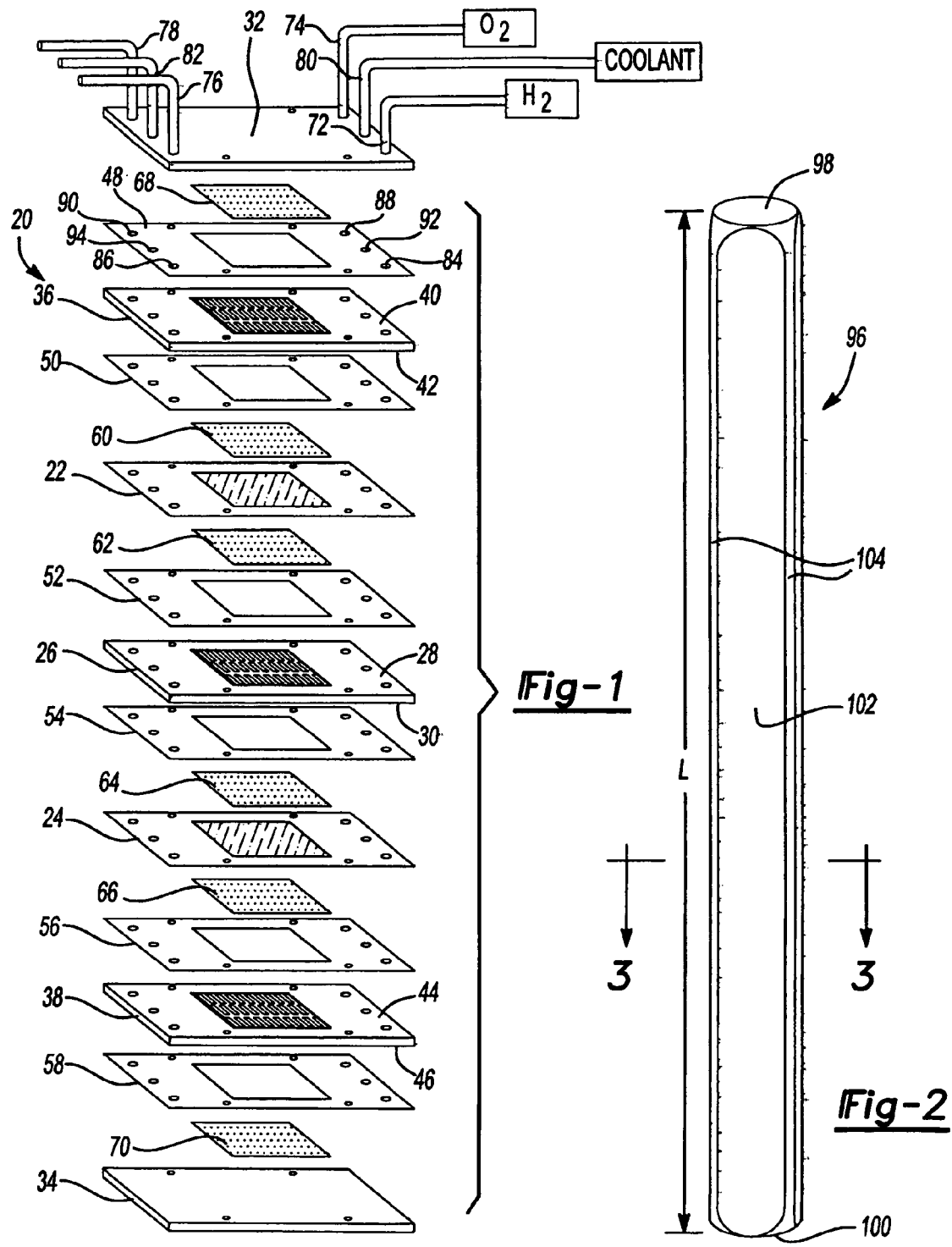

84, 86, 88, 90, 92, 94

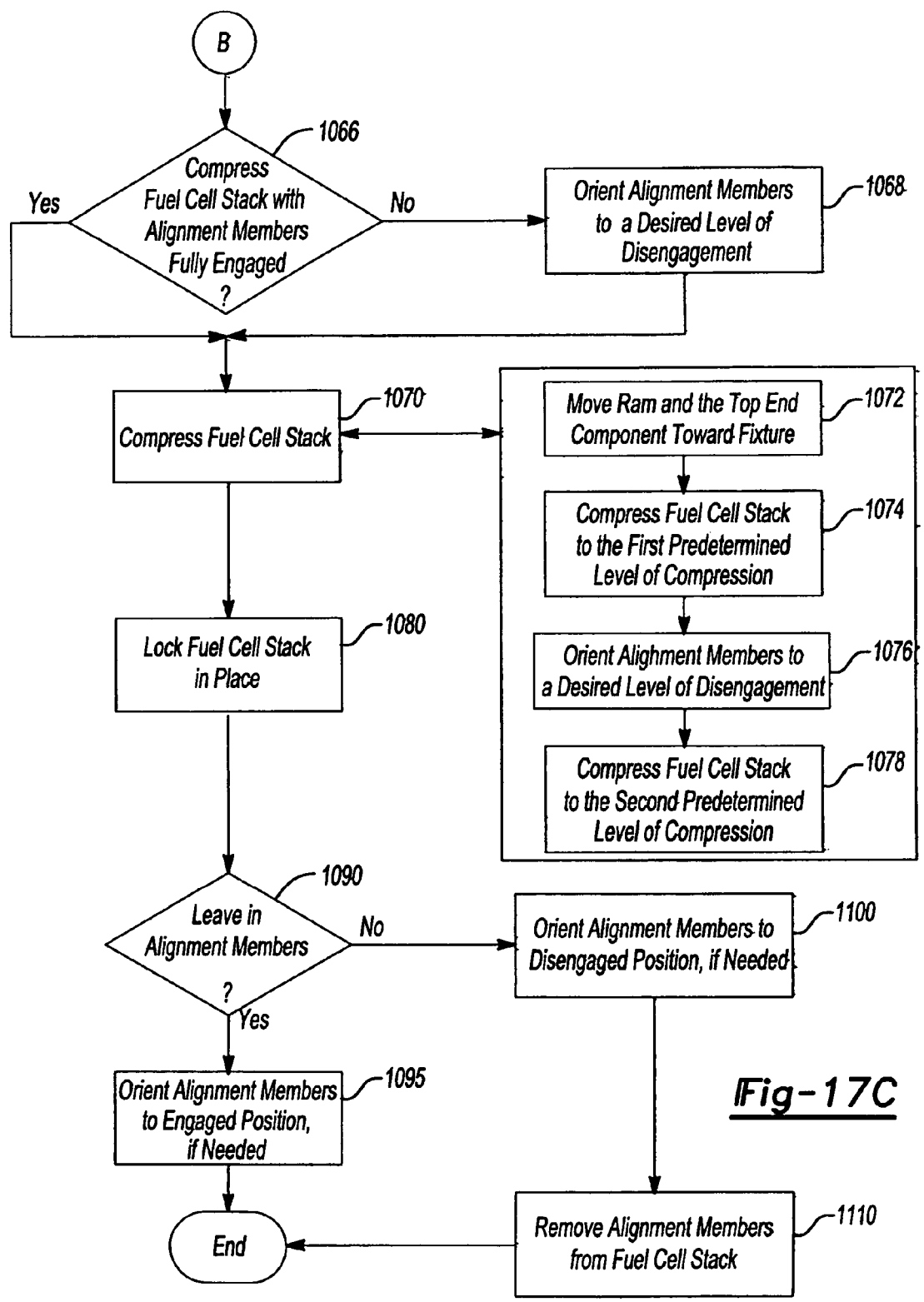

ific examples, while indicating the preferred embodi-

ALIGNING METHOD FOR REPEATING AND NON-REPEATING UNITS IN A FUEL CELL STACK

CROSS-REFERENCE TO RELATED APPLICATION

This application claims the benefit of U.S. Provisional Application No. 60/606,961, filed on Sep. 3, 2004. The disclosure of the above application is incorporated herein by reference.

FIELD OF THE INVENTION

The present invention relates to fuel cell stacks and, more particularly, to an alignment system and a method of assembling a fuel cell stack.

BACKGROUND OF THE INVENTION

Fuel cells are used or have been proposed as a power source in many applications, such as in electrical vehicular power plants to replace internal combustion engines and in stationary applications to produce electrical power. In proton exchange membrane (PEM) type fuel cells, hydrogen is supplied to the anode of the fuel cell and oxygen is supplied to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which serve as current collectors for the anode and cathode, and contain appropriate channels and/or openings therein for distributing the fuel cells' gaseous reactants over the surfaces of the respective anode and cathode catalysts. A typical PEM fuel cell and its MEA are described in U.S. Pat. Nos. 5,272,017 and 5,316,871 issued respectively Dec. 21, 1993 and May 31, 1994 and assigned to General Motors Corporation.

The term "fuel cell" is typically used to refer to either a single cell or a plurality of cells depending on the context. A plurality of individual cells are commonly bundled together to form a fuel, cell stack. Each cell within the fuel, cell stack comprises the MEA described earlier, and each MEA provides its increment of voltage.

Precise alignment, of the components of a fuel cell stack to a predetermined orientation is desirable. The components of a fuel cell stack have typically been aligned during assembly by using external elements to surround or cage the components according to their corresponding perimeters. However, such external elements may limit access to various components during assembly. Additionally, higher tolerance levels are desired than can be provided by such external components. Accordingly, it would be desirable to align the components of a fuel cell stack using internal features.

SUMMARY OF THE INVENTION

The present invention provides an alignment system for and a method of assembling a fuel cell stack. Components of the fuel cell stack have internal alignment features and are aligned to a predetermined orientation during assembly. The invention allows fuel cell stacks to be assembled within high tolerance levels while improving access to each component during assembly. Additionally, the invention can provide additional rigidity to a fuel cell stack.

An alignment system for a fuel cell stack according to the principles of the present invention includes a fixture operable to support components of a fuel cell stack. There is at least one alignment member selectively operable between first and second positions. The alignment member is configured to interact with internal alignment features on components of the fuel cell stack. The first position of the alignment member corresponds to being engaged with the alignment features. The second position of the alignment member corresponds to being disengaged with the alignment features.

In another aspect of the present invention, a fuel cell stack includes a plurality of fuel cells arranged adjacent one another in a stack configuration. The fuel cells have internal alignment features that allow components of each fuel cell to be aligned to a predetermined orientation relative to one another with the use of an alignment member. Each alignment feature includes an engaging surface configured to be selectively engaged and disengaged by an alignment member when the alignment feature is disposed around an alignment member.

In another aspect of the present invention, a method of assembling a fuel cell stack having a plurality of components with internal alignment features is disclosed. The method includes: (1) orienting at least one alignment member in a first position; (2) positioning at least one of the components of the fuel cell stack on the alignment member with the internal alignment feature on the alignment member; (3) aligning the components of the fuel cell stack with the alignment member; and (4) compressing the components of the fuel cell stack together.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is an exploded perspective view of an exemplary fuel cell stack according to the principles of the present invention;

FIG. 2 is a perspective view of an exemplary alignment member according to the principles of the present invention;

FIGS. 17A-17C are a flow chart of the assembling of a fuel cell stack according to the principles of the present invention.

DETAILED DESCRIPTION OF THE PREFERRED EMBODIMENTS

Figure 3A:
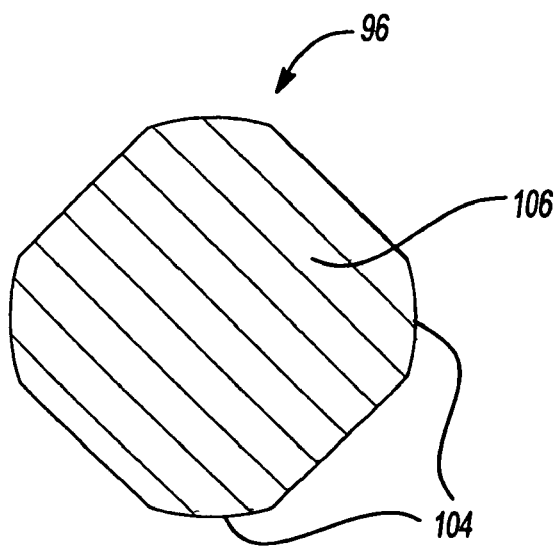
FIG. 3A is a cross-sectional view of the alignment member along line 3-3 of FIG. 2.

The following description of the preferred embodiments is merely exemplary in nature and is in no way intended to limit the invention, its application, or uses.

To gain a better understanding of the present invention, an exploded view of an exemplary fuel cell stack 20 according to the principles of the present invention is shown in FIG. 1. FIG. 1 depicts two individual PEM fuel cells connected to form a stack 20 having a pair of MEAs 22, 24 separated from each other by an electrically conductive, liquid-cooled, bipolar separator plate conductive element 26. The MEAs form the active area of each fuel cell. An individual fuel cell, which is not connected in series within a stack, has a separator plate 26 with a single electrically active side. In a stack, a preferred bipolar separator plate 26 typically has two electrically active sides 28, 30 within the stack, each active side 28, 30 respectively facing a separate MEA 22, 24 with opposite charges that are separated, hence the so-called "bipolar" plate.

The MEAs 22, 24 and bipolar plate 26 are stacked together between stainless steel clamping terminal plates 32, 34 and end contact fluid distribution elements 36, 38. The end fluid distribution elements 36, 38, as well as both working faces or sides 28, 30 of the bipolar plate 26, contain a plurality of lands adjacent to grooves or channels on the active faces 42, 28, 30 and 44 and form flow fields for distributing anode and cathode reactants (i.e., $H_2$ and $O_2$/air) to the MEAs 22, 24. Faces 40 and 46 of the respective end fluid distribution elements 36, 38 also contain a plurality of lands adjacent to grooves or channels but are non-active and do not have fluids flowing therethrough. Nonconductive gaskets or seals 48, 50, 52, 54, 56, and 58 provide seals and electrical insulation between the several components of the fuel cell stack. Gas-permeable conductive diffusion media 60, 62, 64, and 66 press up against the electrode faces of the MEAs 22, 24. Additional layers of conductive media 68, 70 are placed between the end contact fluid distribution elements 36, 38 and the terminal collector plates 32, 34 to provide a conductive pathway therebetween when the stack is compressed during normal operating conditions. The end contact fluid distribution elements 36, 38 press up against the diffusion media 60, 68 and 66, 70 respectively. Alternatively, unitized MEAs (not shown) having the MEA, diffusion media layers, and sealing members bundled together as a single component can be used.

Anode reactant in the form of $H_2$ is supplied to the anode flow fields of fuel cell stack 20 from a storage tank, a methanol or gasoline reformer, or the like, via appropriate supply plumbing 72. Similarly, cathode reactant in the form of $O_2$/air is supplied to the cathode flow fields of the fuel cell stack 20 from a storage tank or from the ambient via appropriate supply plumbing 74. Exhaust plumbing 76, 78 for the anode and cathode effluents produced in the respective anode and cathode flow fields of fuel cell stack 20 are also provided. Additional supply plumbing 80 is provided for circulating coolant through bipolar plates 26 and end plates 36, 38 and out exit plumbing 82. Supply and exit or exhaust plumbing 72, 74, 76, 78, 80, and 82 take the form of headers within the fuel cell stack 20.

The various components of fuel cell stack 20 have apertures 84, 86, 88, 90, 92, and 94 that align to form supply and return fluid headers for the reactant and coolant flows. The apertures may be included on the following components: MEAs 22 and 24, sealing members 48, 50, 52, 54, 56, and 58, bipolar plate 26, end fluid distribution elements 36 and 38, and terminal plates 32 and 34. Apertures 84 and 86 are in fluid communication with anode reactant plumbing 72 and 76. Apertures 88 and 90 are in fluid communication with cathode reactant plumbing 74 and 78. Similarly, apertures 92 and 94 are in fluid communication with coolant plumbing 80 and 82. In some embodiments of the present invention, apertures 84, 86, 88, 90, 92, and 94 may also serve as internal alignment features of the components of fuel cell stack 20, as described in more detail below.

Referring now to FIG. 2, an exemplary alignment member 96 according to the principles of the present invention is shown. Alignment member 96 has opposite ends 98 and 100 with a length L defined therebetween. Alignment member 96 also includes an exterior surface 102 with portions 104 designed to selectively engage with the internal alignment features of the components of fuel cell stack 20.

The alignment members can be made of a variety of materials. For example, alignment members 96 can be made of metal, such as a highly polished steel, polymer, and ceramic materials. Alignment members 96, when designed to remain in the fuel cell stack, are made of an electrically nonconductive material or have a nonconductive coating. Alignment members 96 may also have a coating to reduce friction when interacting with components of fuel cell stack 20, as described in more detail below. Suitable coatings include Teflon® coating, graphite, and molybdenum sulfide, but other coatings may be used.

Figure 3B:
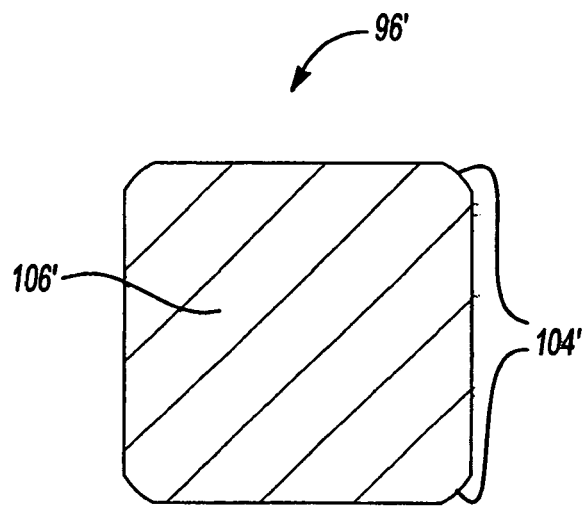
FIGS. 3B-3D are cross-sectional views of alternate embodiments of an alignment member along line 3-3 of FIG. 2 according to the principles of the present invention.
Figure 3C:
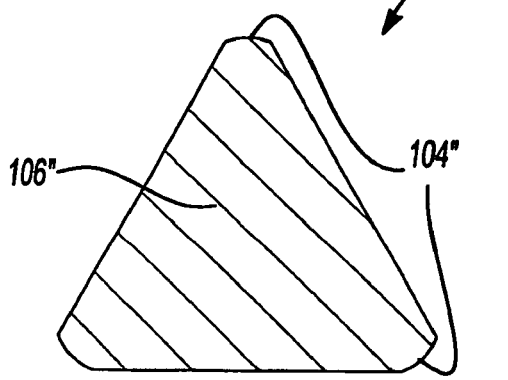
Figure 3D:
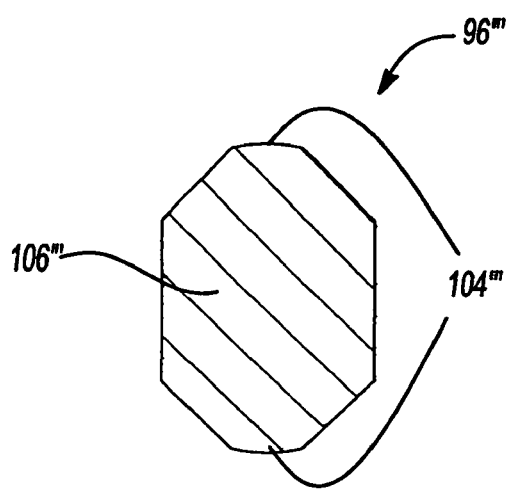
Figure 4A:
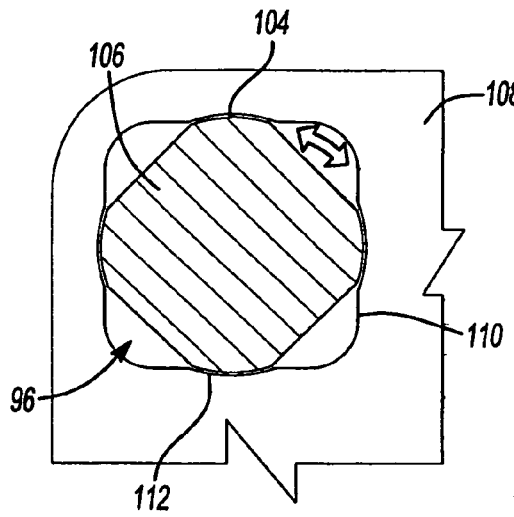
FIGS. 4A and 4B are plan views of an alignment member with the cross section of FIG. 3A respectively engaged and disengaged with a corresponding alignment feature of a component of a fuel cell stack according to the principles of the present invention.
Figure 4B:
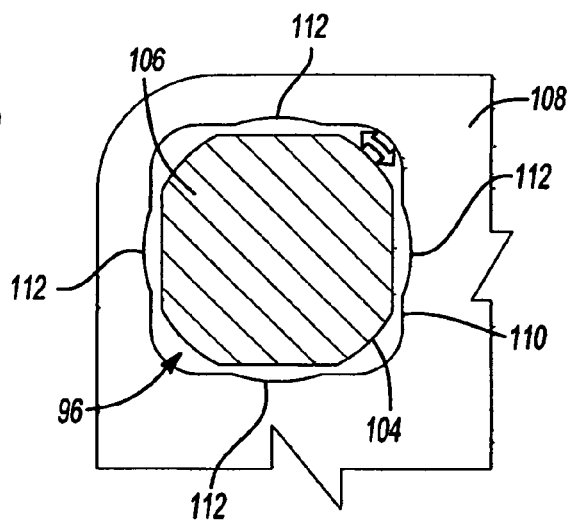

FIG. 3A shows a cross section 106 of the preferred embodiment of alignment member 96. Engaging portions 104 are convex and designed to engage with similarly curved alignment features in the fuel cell components, as described in more detail below. FIGS. 3B-3D show cross sections of alternate embodiments of alignment member 96. FIG. 3B shows an alignment member 96' with a substantially square cross section 106' with engaging portions 104' formed by rounded corners. Alignment member 96' is substantially similar to alignment member 96 of FIG. 3A, but engaging portions 104' have a smaller radius of curvature than engaging portions 104. FIG. 3C shows an alignment member 96" with a substantially triangular cross section 106" with engaging portions 104" formed by rounded corners. FIG. 3D shows an alignment member 96''' with a substantially octagonal cross section 106''' with engaging portions 104''' on two of the sides.

Referring now to FIGS. 4-7, the various embodiments of alignment member 96 are shown interacting with internal alignment features on components of a fuel cell stack. FIG. 4A shows a portion of a component 108 of fuel cell stack 20 disposed around and engaged with the preferred embodiment of alignment member 96. Convex portions 104 are engaged with a generally square internal alignment feature 110 of component 108. Specifically, portions 104 engage with four complementary concave surfaces 112 of alignment feature 110 to provide four areas or points of interactions between alignment member 96 and component 108 to align component 108, as described in more detail below. The areas of contact provide low contact stress and high load carrying capacity between the alignment member and the component. FIG. 4B shows alignment member 96 disengaged from engaging surfaces 112 of internal alignment feature 110. Alignment member 96 has been rotated about a longitudinal axis to move from the engaged position, shown in FIG. 4A, to the disengaged position shown in FIG. 4B.

Figure 5A:
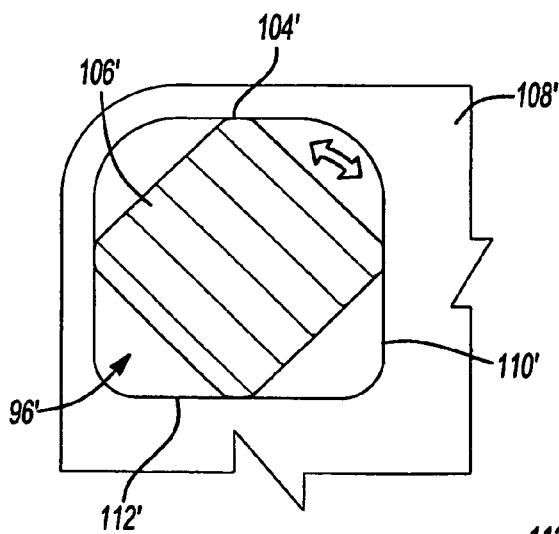
FIGS. 5A and 5B are plan views of an alignment member with the cross section of FIG. 3B respectively engaged and disengaged with the corresponding alignment feature of a component of a fuel cell stack according to the principles of the present invention.
Figure 5B:
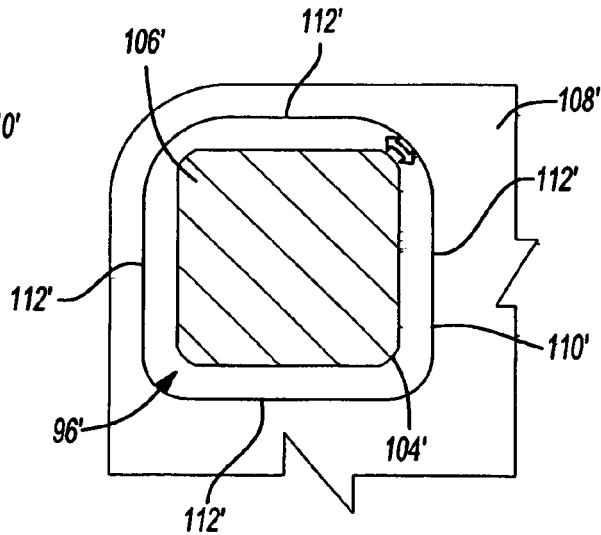
Figure 6A:
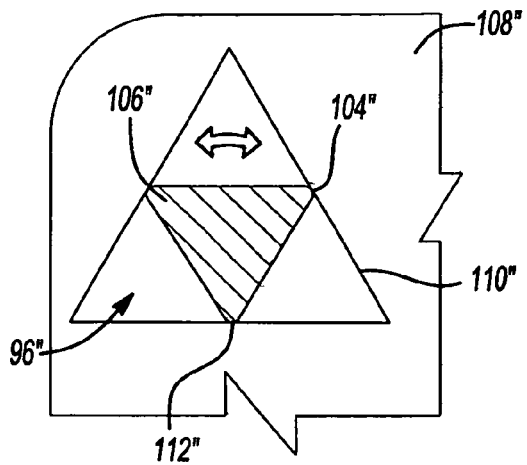
FIGS. 6A and 6B are plan views of an alignment member with the cross section of FIG. 3C respectively engaged and disengaged with a corresponding alignment feature of a component of a fuel, cell stack according to the principles of the present invention.
Figure 6B:
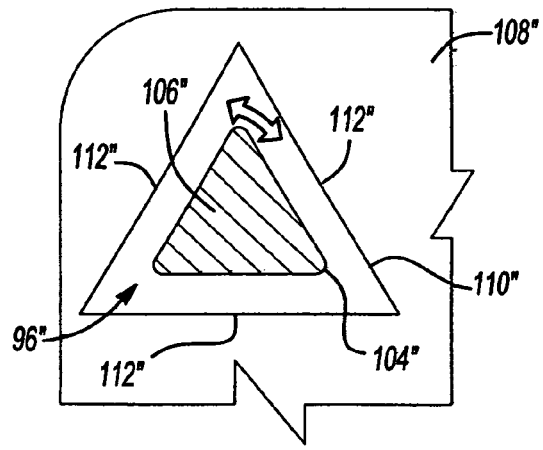
Figure 7A:
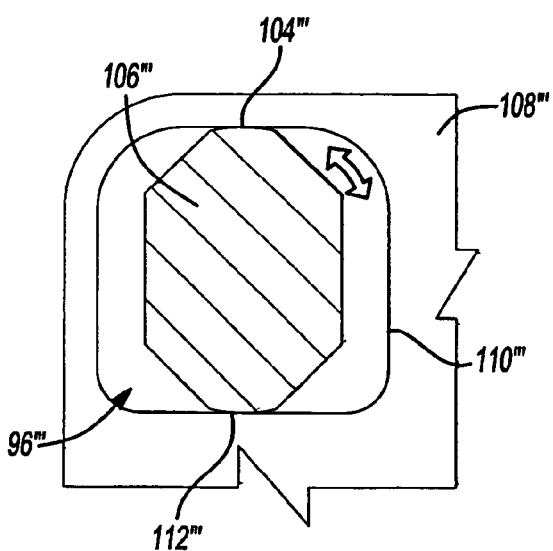
FIGS. 7A and 7B are plan views of an alignment member with the cross section of FIG. 3D respectively engaged and disengaged with the corresponding alignment feature of a component of a fuel cell stack according to the principles of the present invention.
Figure 7B:
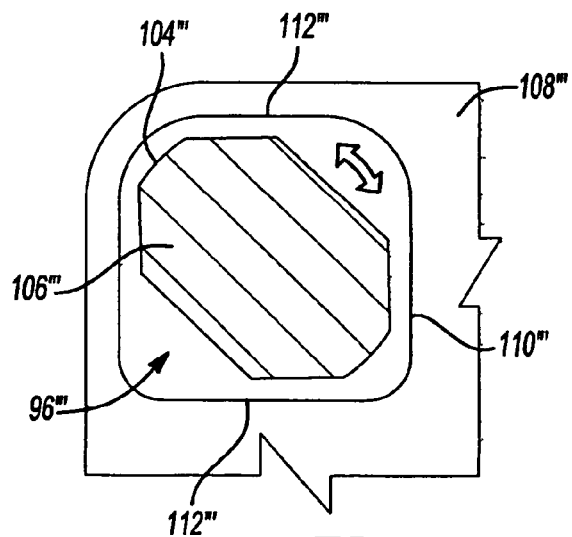

The alternate embodiments of alignment member 96 and the corresponding shapes of alignment feature 110 are shown in FIGS. 5-7. In these embodiments, the alignment member is also rotated about a longitudinal axis to move between the engaged and disengaged positions. FIGS. 5A and 5B show alignment member 96' and component 108' having a generally square alignment feature 110'. Portions 104' of alignment member 96' engage with substantially flat engaging surfaces 112' of internal alignment feature 110' to provide four points or areas of interaction between alignment member 96' and component 108' to align component 108', as described in more detail below. FIGS. 6A and 6B show alignment member 96" and component 108" having a generally triangular alignment feature 110". Portions 104" of alignment member 96" engage with three substantially flat engaging surfaces 112" of internal alignment feature 110" to provide three points or areas of interaction between alignment member 96" and component 108" to align component 108", as described in more detail below. Similarly, FIGS. 7A and 7B show alignment member 96''' and component 108''' having a generally square alignment feature 110'''. Portions 104''' of alignment member 96''' engage with two substantially flat engaging surfaces 112''' of internal alignment feature 110''' to provide two points or areas of interaction between alignment member 96''' and component 108''' to align component 108''', as described in more detail below.

As described above, each alignment member provides at least two points or areas of interaction with each component. It is expected that two or more alignment members will be used to align the components of the fuel cell stack. In total, at least five points or areas of interaction are desired between all of the included alignment members and the components in order to align the components according to the principles of the present invention. Typically, combinations of alignment members that provide five or six total points or areas of interaction are used. Preferably, two substantially square alignment members identical in size and shape are used to provide six points or areas of interaction. One square alignment member interacts with square alignment features to provide four points or areas of interaction, and the other square alignment member interacts with rectangular alignment features to provide two points or areas of interaction yielding a total of six points or areas of interaction. It should be appreciated that various combinations can be employed to achieve the desired total number of points on areas of interaction.

According to the principles of the present invention, the alignment members can be selectively engaged and disengaged with the internal alignment features of the components of a fuel cell stack by rotating about a longitudinal axis. Additionally, the alignment members can be selectively positioned in various orientations between the fully engaged position and the fully disengaged position to provide a desired level of engagement with the internal alignment features. Fully disengaged alignment members may be moved in an axial direction relative to the components without contacting any of the components and then re-engaged with the components or removed from the fuel cell stack, as described in more detail below. When in the engaged position, the components engaged with the alignment members will be aligned in a desired orientation relative to one another as described in more detail below.

The location of the internal alignment features on a component can vary depending upon the design of the fuel cell stack. For example, the alignment feature can be disposed inside or outside a sealing perimeter of the fuel cell stack.

Figure 8:
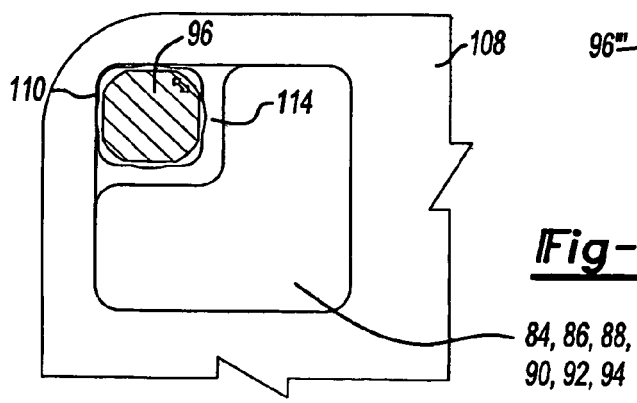
FIG. 8 is a plan view of the alignment member with the cross-section of FIG. 3A disengaged with an alignment feature corresponding to a portion of a fluid header according to the principles of the present invention.

Preferably, the internal alignment features are discrete apertures in the components independent of the fluid headers and located outside of the sealing perimeter of the fuel cell stack. If the locations are outside of the sealing perimeter, the internal alignment features may have a discontinuous perimeter and may be included on all of the components. Alternatively, as shown in FIG. 8, the internal alignment features can be a partitioned portion of a fluid header. In such a case, a segregating member 114 partitions a portion of the header and forms part of the alignment feature. When the fuel cell stack is operating, the same fluid will flow through both the header and the associated alignment feature, as well as therebetween.

Figure 9A:
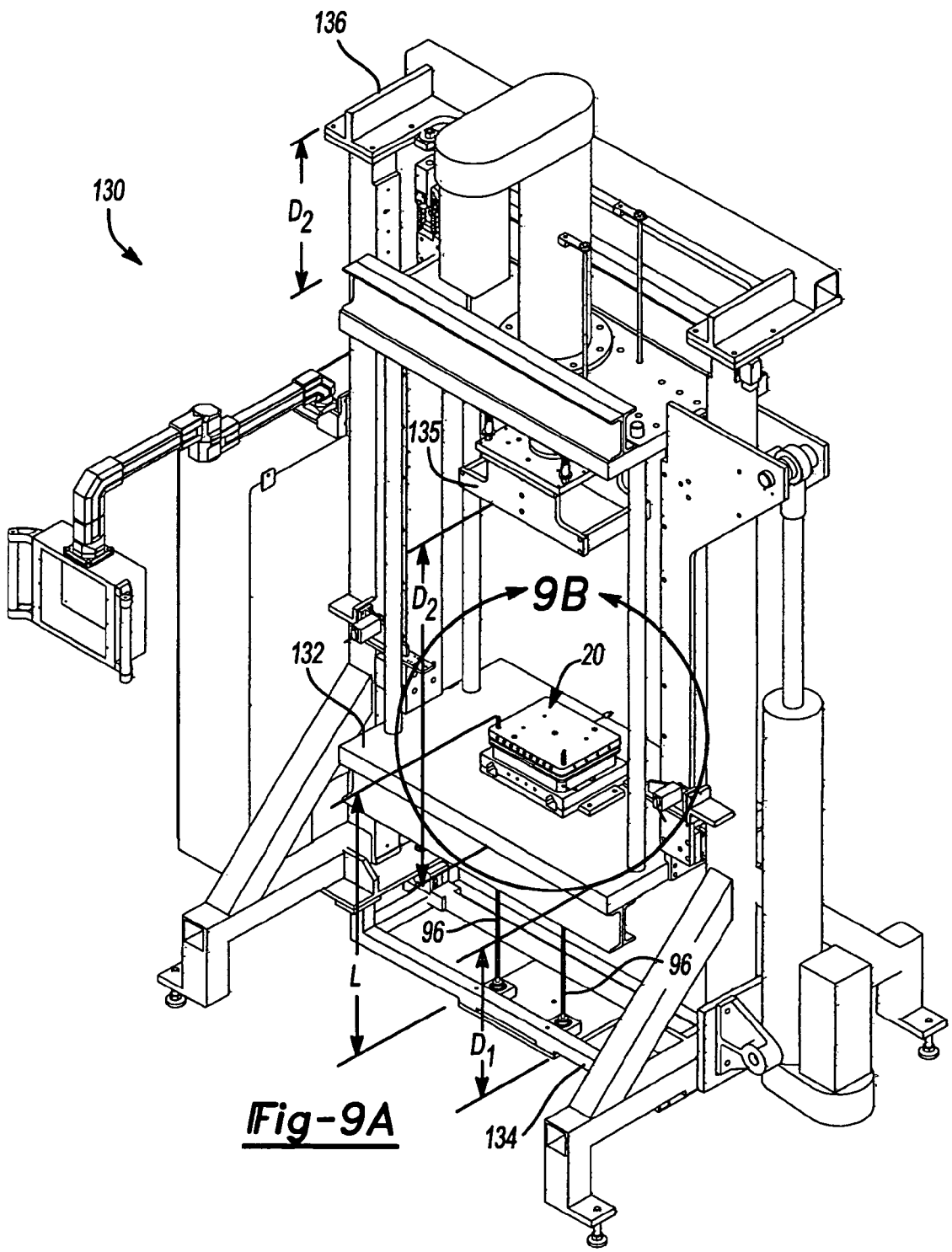
FIGS. 9A-11B are perspective views of an assembly mechanism with a fuel cell stack in various stages of assembly according to the principles of the present invention.
Figure 9B:
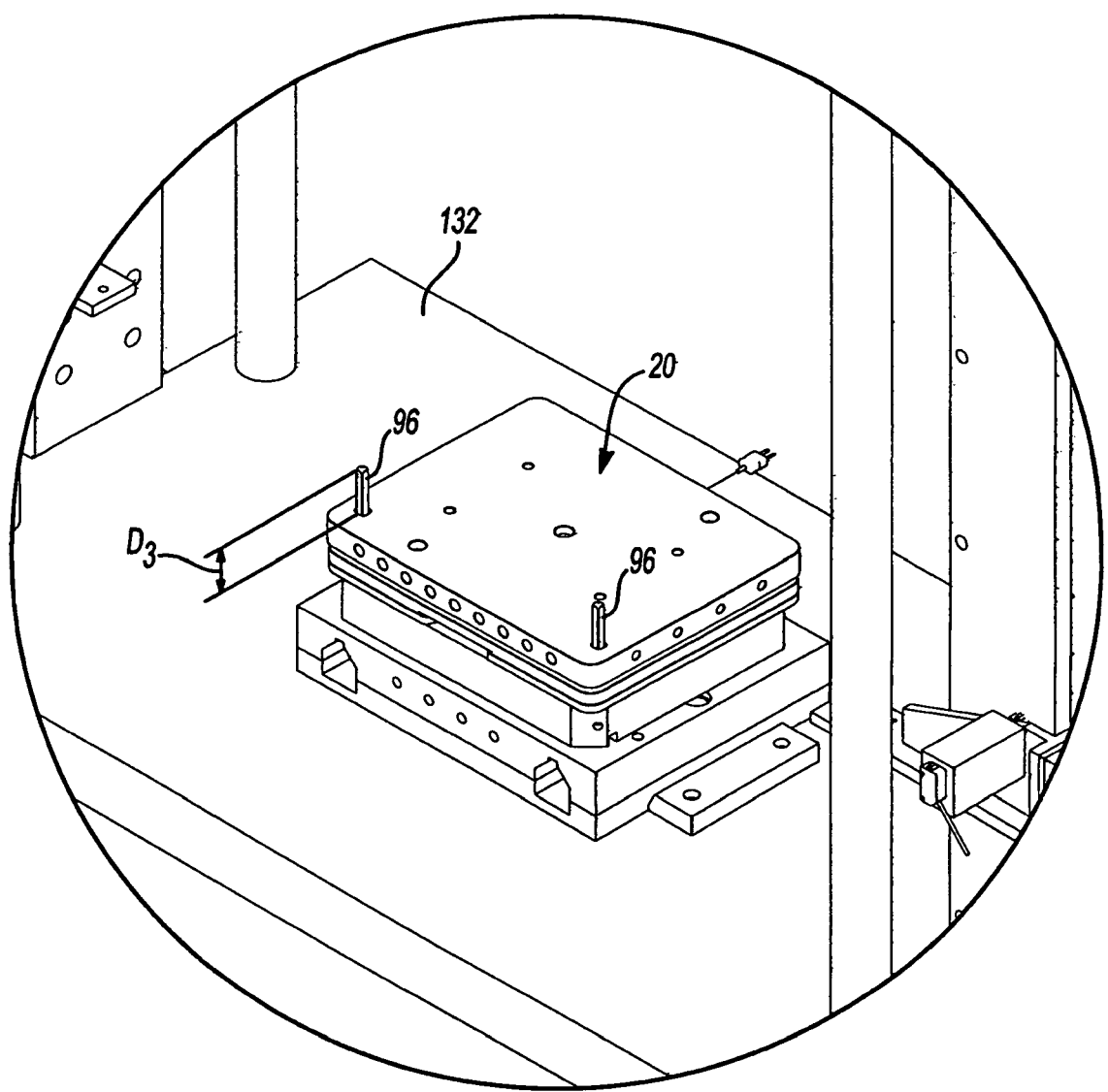

FIGS. 9-11 show an assembly mechanism 130 for assembling a fuel cell stack according to the principles of the present invention. Referring to FIGS. 9A and 9B, assembly mechanism 130 is shown with fuel cell stack 20 partially assembled. Assembly mechanism 130 includes a moveable support fixture 132, a moveable ram or press 135 and two alignment members 96 which each have a length L. Fixture 132 supports the components of fuel cell stack 20 during the assembly process. Ram 135 and/or fixture 132 compress the components of fuel cell stack 20 together during the assembly process, as described below.

Figure 12A:
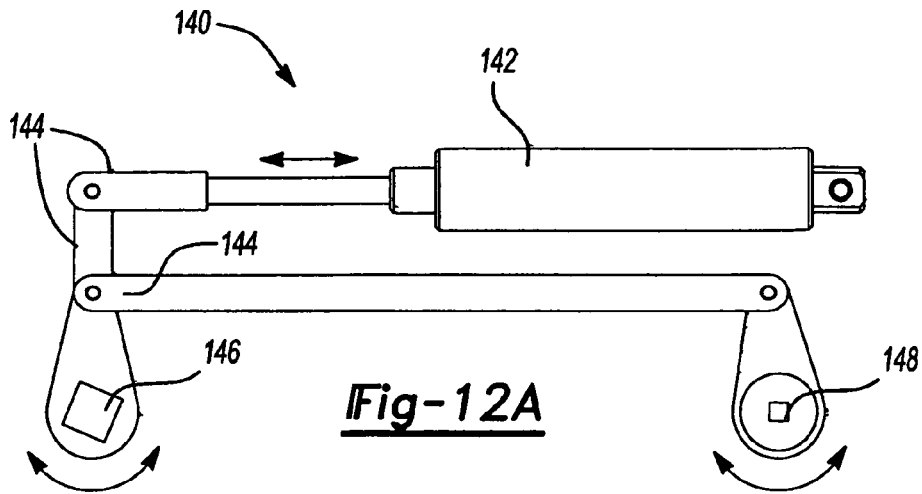
FIGS. 12A and 12B are side views of an actuator for a pair of alignment members in respective first and second positions according to the principles of the present invention.
Figure 12B:
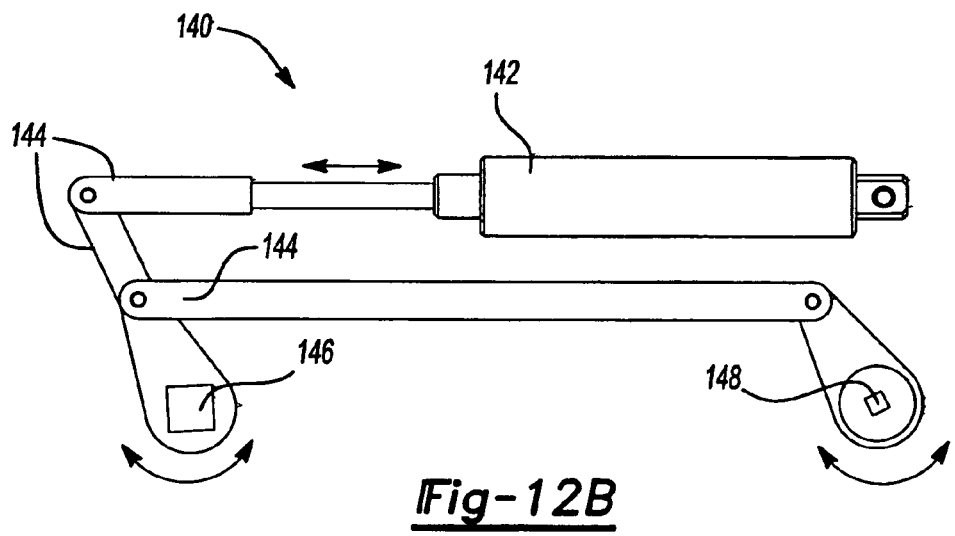

As stated above, alignment members 96 are rotatable between a fully engaged position, a fully disengaged position, and intermediate positions therebetween. To power such rotation, alignment members 96 may be coupled to an actuating mechanism 140, shown in FIGS. 12A and 12B in first and second positions, respectively. Actuating mechanism 140 includes a linear actuator 142 which powers links 144 to rotate apertures 146 and 148 between first and second positions corresponding to fully engaged and fully disengaged positions of alignment members 96 and to intermediate positions therebetween to provide a desired level of engagement.

Referring again to FIG. 9A, distance $D_1$ is defined as the distance between the top of fixture 132 and a bottom reference location 134 of assembly mechanism 130. Fixture 132 is operable to vary distance $D_1$ according to the number of components in order to maintain the working height in the desired range, to provide room for additional components, and to assist in compressing the components together. Distance $D_2$ is defined as the distance between a reference point on moveable ram 135 and a reference point on moveable fixture 132. FIG. 9B shows an enlarged view of fuel cell stack 20 and fixture 132. Distance $D_3$ is defined as the distance between the top of alignment members 96 and the top of the current uppermost component of fuel cell stack 20. During assembly, distance $D_3$ is maintained within a limited range as the working height of the system is maintained within a desired range, as described in more detail below. Maintaining distance $D_3$ within a limited range provides easy access to each component during assembly.

Figure 10A:
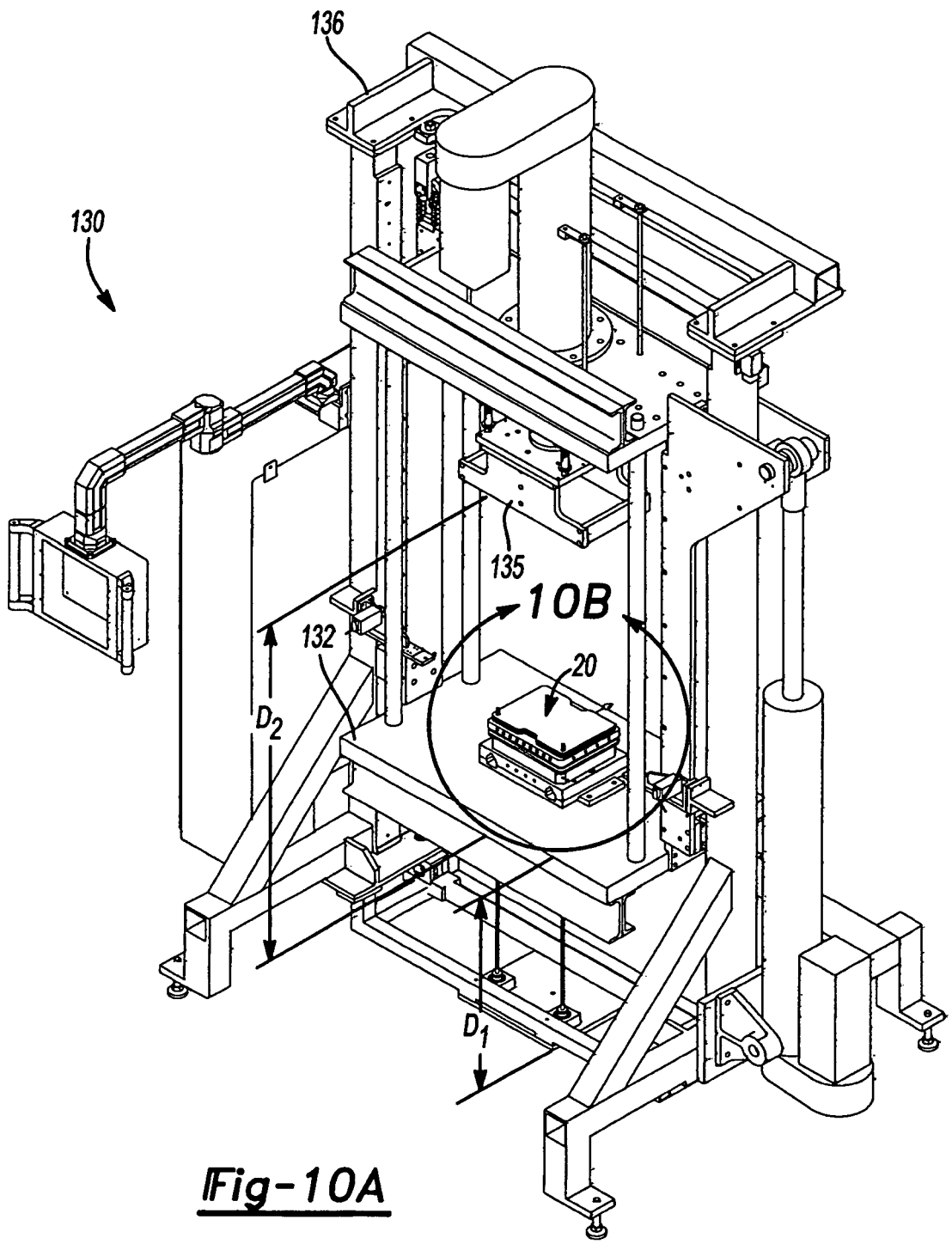
Figure 10B:
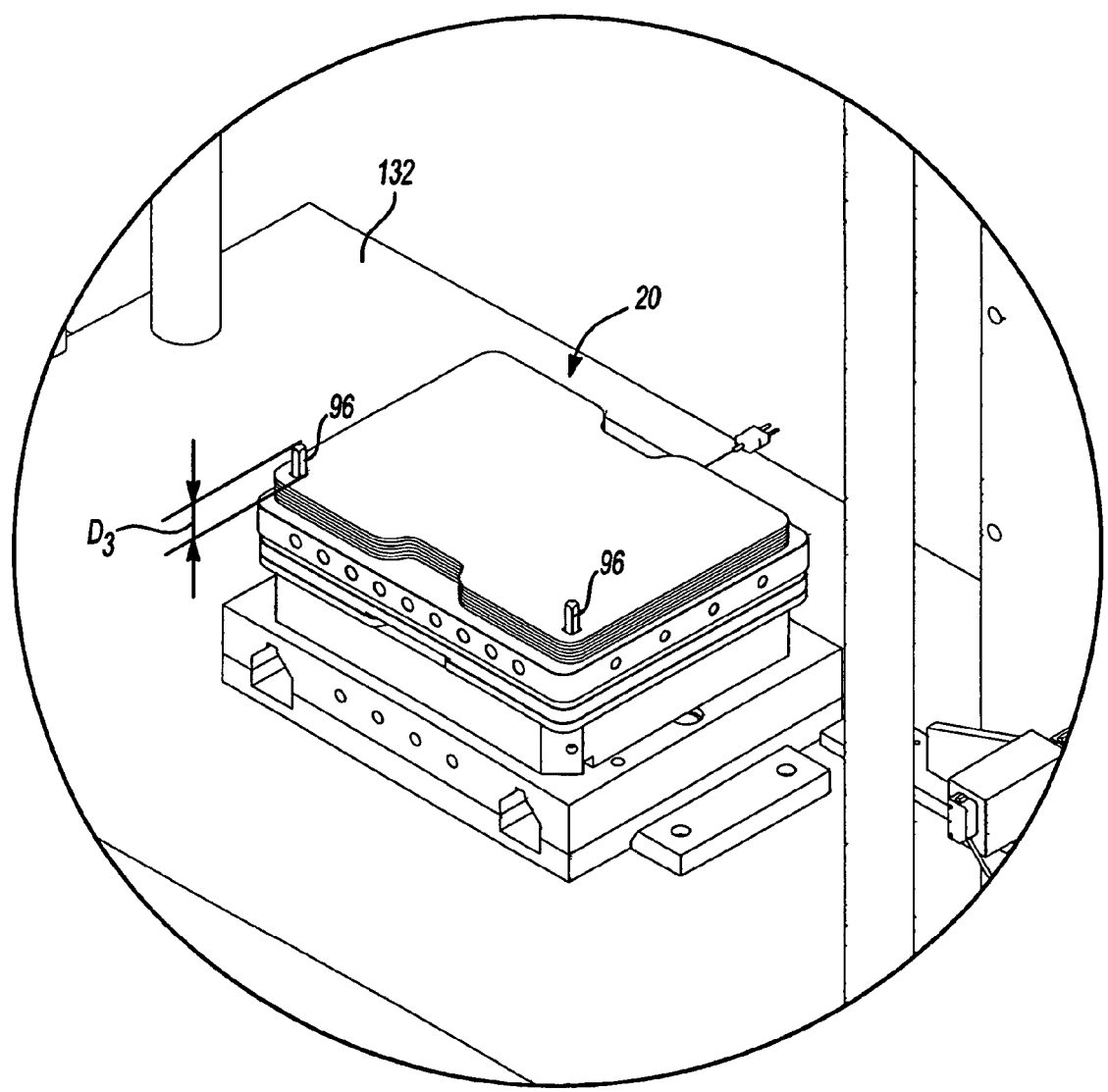
Figure 11A:
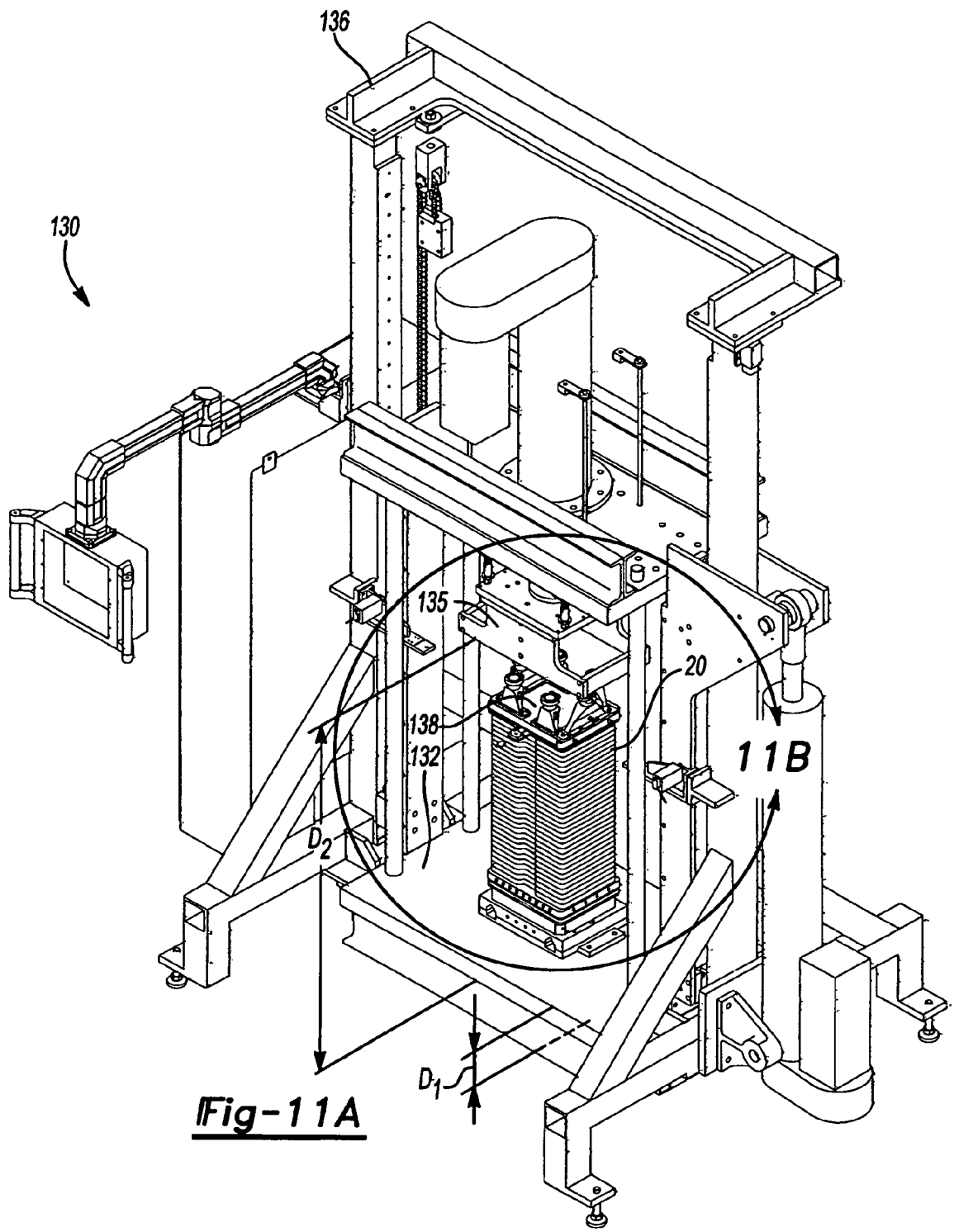
Figure 11B:
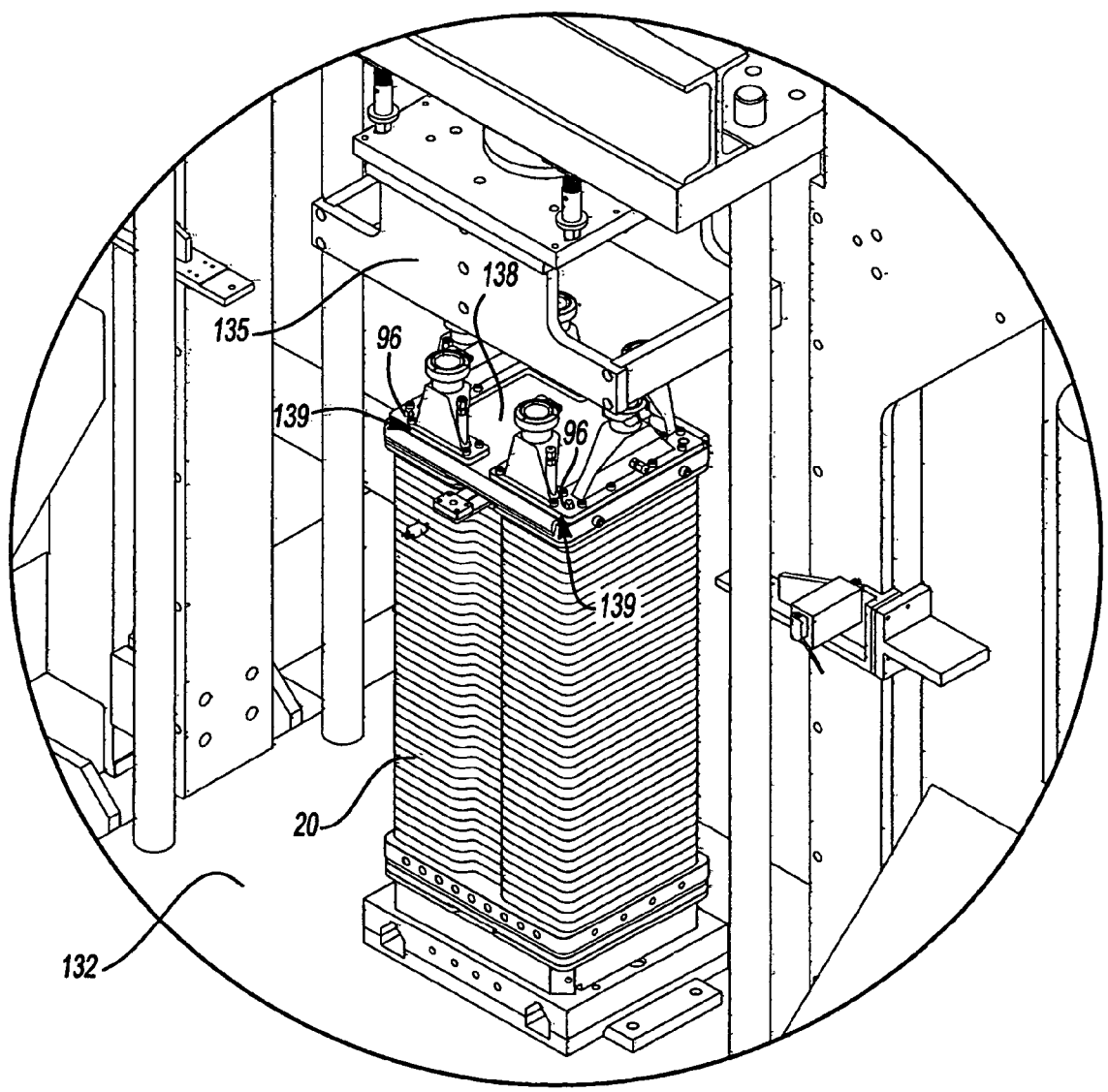

FIGS. 10A and 10B show assembly mechanism 130 with more components of fuel cell stack 20 assembled together. Additionally, FIGS. 11A and 11B show assembly mechanism 130 with all of the components of fuel cell stack 20 aligned and compressed together by compression apparatus 138.

In the preferred embodiment, discussed above, alignment member 96 does not interact with a spring mechanism. The spring mechanism corresponds with a first alternate embodiment of an alignment member and is discussed in detail below. Prior to discussing the details of the first alternate embodiment, assembly of a fuel cell stack 20 utilizing the preferred embodiment of an alignment member 96 is explained.

Figure 17A:
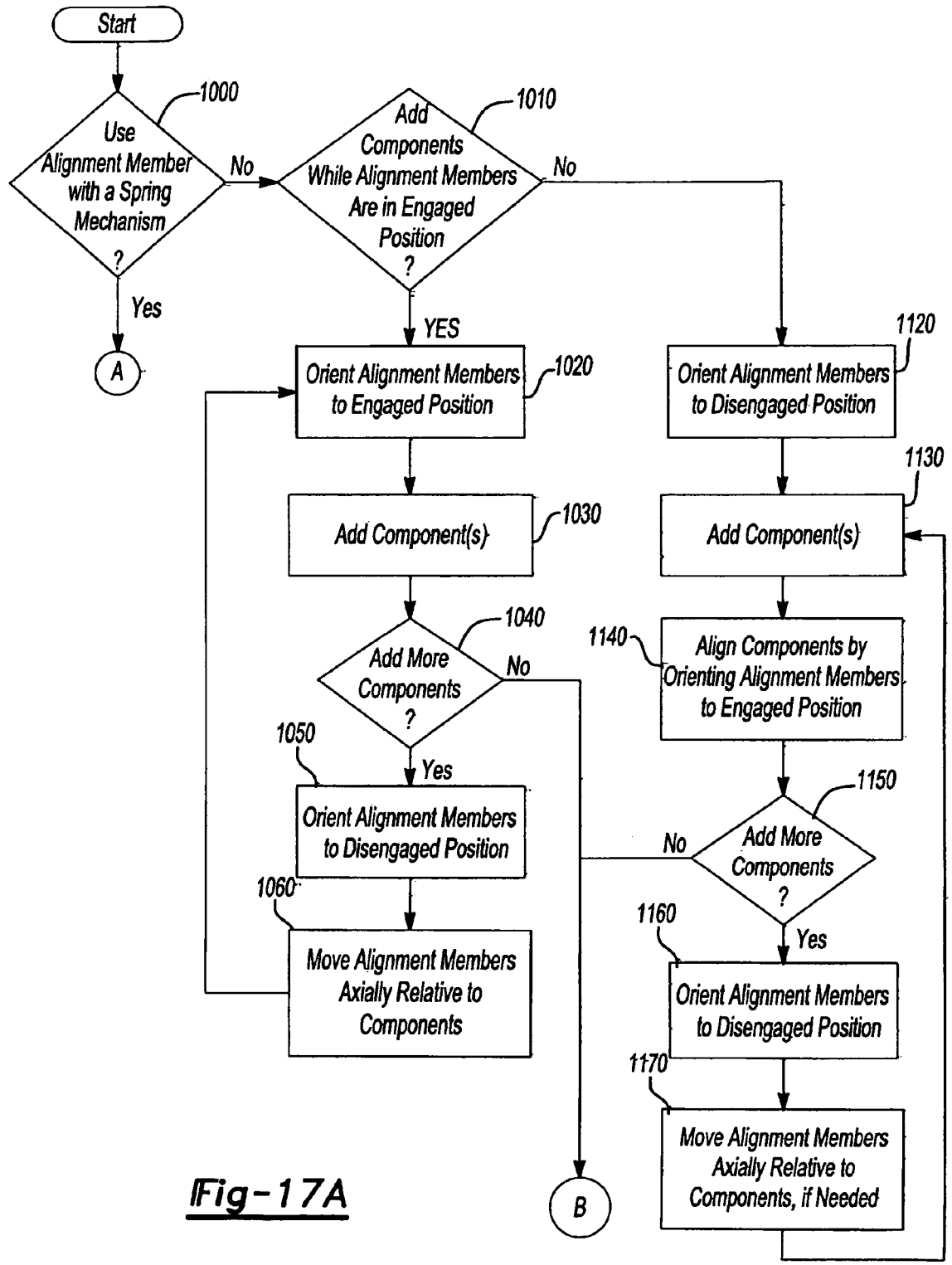
Figure 17B:
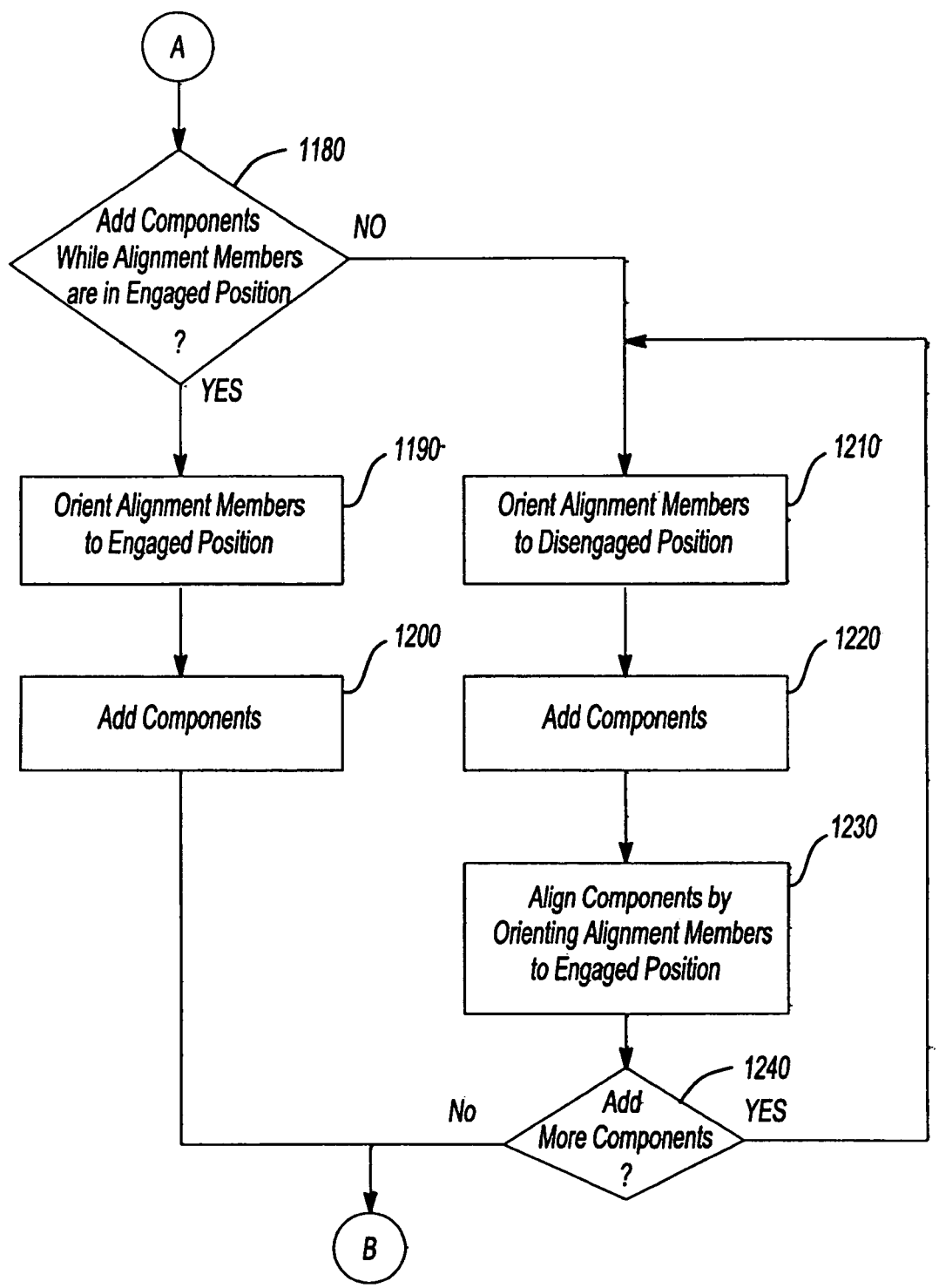

Referring to FIGS. 17A-17C, the assembly of fuel cell stack 20 according to the methods of the present invention utilizing the various embodiments of an alignment member are shown. As indicated in decision block 1000, the method will differ depending upon whether a spring mechanism is used in conjunction with the alignment member. When a spring mechanism is not utilized in conjunction with alignment member 96, the assembly method proceeds to decision block 1010. Fuel cell stack 20 may be assembled with alignment members 96 in engaged or disengaged positions, as indicated in decision block 1010. Preferably, fuel cell stack 20 is assembled with alignment members 96 in an engaged position. When this is the case, alignment members 96 are oriented to an engaged position by actuating mechanism 140, as indicated in block 1020.

Components of fuel cell stack 20, either singularly or in a group, are positioned on alignment members 96 with the alignment features 110 aligned with alignment members 96. The component(s) are slid along the length of alignment members 96, for a distance $D_3$, until they are situated immediately adjacent any preceding components or fixture 132 of assembly mechanism 130. The components are slid along the length of alignment members 96 with engaging portions 104 engaged with engaging surfaces 112 of the alignment features 110. During this phase of assembly, alignment members 96 can only accommodate a certain number of components, as represented by distance $D_3$ shown in FIGS. 9B and 10B. Once distance $D_3$ diminishes below a predetermined minimum value, addition of further components of fuel stack 20 is stopped.

If further components need to be added, as indicated in decision block 1040, alignment members 96 are rotated to the disengaged position by actuating mechanism 140, as indicated in block 1050. With alignment members 96 disengaged from the components of fuel cell, stack 20 that have already been assembled, alignment member 96 is free to move axially relative to the components. Fixture 132 is lowered so that distance $D_1$ decreases while distance $D_3$ increases, as indicated in block 1060. With alignment members 96 now extending above the uppermost component of fuel cell stack 20 a sufficient distance to enable additional components to be added, alignment members 96 are again rotated to the engaged position by actuating mechanism 140, as indicated in block 1020. The assembly process represented in FIG. 17A by blocks 1020, 1030, 1040, 1050 and 1060 continues until the total desired number of components is reached. Once all of the components are added, as indicated in decision block 1040, the final assembly of fuel cell stack 20 is ready to be commenced, as shown in FIG. 17C.

During the final assembly fuel cell stack 20 is compressed, as shown in FIG. 17C. Fuel cell stack 20 can be compressed with alignment members 96 in an engaged position, a disengaged position, or at some level therebetween. Thus, a determination is made as to whether fuel cell stack 20 is to be compressed with alignment members 96 in the fully engaged position, as indicated in decision block 1066. If it is desired to compress fuel cell stack 20 with alignment members 96 in some level of disengagement, alignment members 96 are oriented to a desired level of disengagement, as indicated in block 1068. When alignment members 96 are maintained in the fully engaged position during compression, alignment members 96 help to maintain the alignment of the components of fuel cell stack 20 during the compression. When compressing fuel cell stack 20 with alignment members 96 slightly disengaged (a level of disengagement), alignment members 96 still help maintain the components of fuel cell stack 20 in their desired orientation during the compression while also reducing wear on alignment members 96 and helping to minimize the potential for damage to the components of fuel cell stack 20 during the compression process. With alignment members 96 in the desired orientation (position), fuel cell stack 20 is then compressed, as indicated in block 1070.

Referring to FIGS. 11A and B, a top end component 138 of fuel cell stack 20 is secured to ram 135 and ram 135 moves toward fixture 132 and compresses the various components together. As distance $D_2$ decreases, the components of fuel cell stack 20 are compressed together. The compression can be a single-phase compression regime or a two-phase compression regime, as described below. In the single-phase compression regime, movement of the components relative to alignment members 96 is accommodated with apertures 139 that extend through the top end (uppermost) component 138 of fuel cell stack 20 and any components of assembly mechanism 130 that would interfere with the relative movement. Fuel cell stack is compressed by ram 135 and/or fixture 132 until a desired compressive force is imparted thereon or a desired compressive distance has been attained.

Preferably, the two-phase compression regime, indicated in blocks 1072-1078, is utilized. In the two-phase compressive regime, top end component 138 does not include apertures 139 that allow alignment members 96 to extend therethrough during the compression of fuel cell stack 20. Rather, top end component 138 includes a plurality of blind bores 150, shown in FIG. 18, that have generally the same geometry as the alignment features on the other components of the fuel cell stack. Blind bores 150 receive a portion of alignment members 96 during the compressing of fuel cell stack 20.

Figure 18:
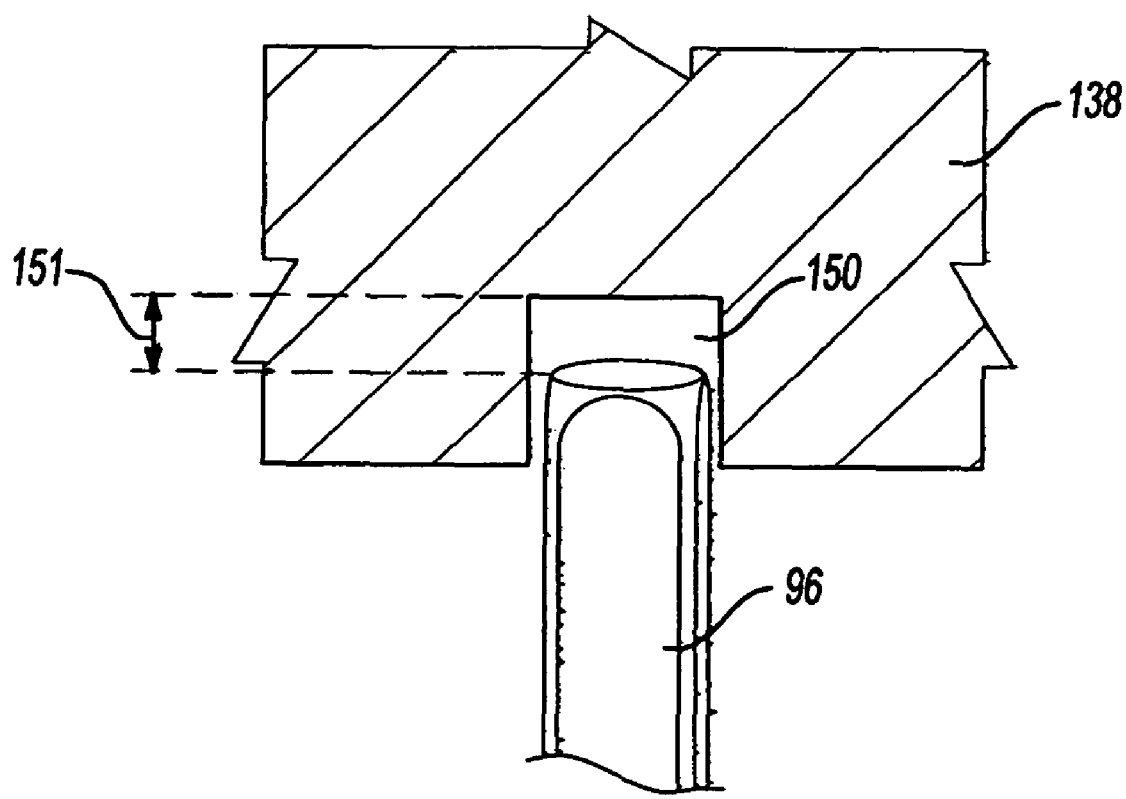
FIG. 18 is a simplified partial cross-sectional view of an alignment member in a blind bore of a top end component of a fuel cell stack with a gap therebetween according to the principles of the present invention.

In the first phase of the two-phase compression regime, ram 135 (with top end component 138 secured thereto) is moved toward fixture 132, as indicated in block 1072, with the alignment members 96 in a either a fully or partially engaged position. Preferably, alignment members 96 are in the fully engaged position. Ram 135 is moved toward fixture 132 and fuel cell stack 20 is compressed therebetween until a first predetermined level of compression is achieved, as indicated in block 1074. The first predetermined level of compression corresponds to a gap 151 of a predetermined maximum magnitude existing between the end of alignment members 96 and the end of blind bores 150, as shown in FIG. 18. The predetermined maximum magnitude of gap 151 is set to correspond to a level of compression wherein the components are compressed to a degree that the friction between the components inhibits relative movement that would alter the alignment of the components during subsequent additional compression with the alignment members 96 fully disengaged.

Once the first predetermined level of compression is achieved, the second phase of the compression regime begins. Alignment members 96 are moved to a further disengaged position and, preferably, to the fully disengaged position, as indicated in block 1076. Fuel cell stack 20 is compressed to a second predetermined level of compression, as indicated in block 1078. During this second phase of compression, ram 135 and fixture 132 are moved toward one another in a synchronized manner such that gap 151 is maintained within a predetermined level of tolerance during the movement. That is, ram 135 and fixture 132 are simultaneously moved in unison (at substantially the same rate) toward one another. As a result, gap 151 is maintained within the predetermined level of tolerance during the second phase of compression. The second predetermined level of compression corresponds to a desired final compressive force or a desired final distance of compression being imparted on fuel cell stack 20.

Regardless of which compression regime is utilized, once fuel cell stack 20 has been compressed the desired distance or is subjected to a desired compressive force, the end plates of, fuel cell stack 20 are locked in place, as indicated in block 1080. With the end plates secured in place relative to one another, fuel cell, stack, 20 then maintains the compressive force on the various components within the fuel, cell stack and movement of the components relative to one another is severely inhibited.

Alignment members 96 can be removed from fuel, cell stack 20 or, alternatively, can remain within fuel cell stack 20 to provide additional rigidity and support to the fuel cell stack. Preferably, alignment members 96 are removed from fuel cell stack 20. However, if the alignment members are to be left within fuel cell stack 20, as indicated in decision block 1090, then it is preferred that alignment members 96 be in the engaged position. Accordingly, alignment members 96 are moved to the engaged position, if needed, as indicated in block 1095, and the method of assembly according to the present invention is then complete. If the alignment members 96 are to be removed, the alignment members 96 are rotated by actuator mechanism 140 to the disengaged position, if needed, as indicated in block 1100. With the alignment members disengaged, the alignment members can then be removed from fuel cell stack 20, as indicated in block 1100. To remove the alignment members, ram 135 is moved upward to its nominal position and fuel cell stack 20 can be moved relative to alignment members 96 by movement of support fixture 132. Fuel cell stack 20 can then be removed from assembly mechanism 130 and the assembly of fuel, cell stack 20 according to the present invention is complete.

As stated above, components of fuel cell stack 20 can be added while the alignment members are in a disengaged position instead of in the engaged position previously discussed, as indicated by decision block 1010. In this case, as indicated in block 1120, alignment members 96 are rotated to a disengaged position by actuating mechanism 140. Components (either singularly or in generally aligned groups) of fuel cell stack 20 are then assembled together on fixture 132 by sliding the component(s) along the length $D_3$ of alignment members 96 and positioning the component(s) in a generally aligned orientation relative to any preceding component(s). The number of components added at this point will vary depending upon the number of components alignment members 96 can align relative to one another by rotating into the engaged position.

When the allowable (or lesser, if desired) number of component(s) have been added, the components are then aligned to a specific orientation relative to one another by rotating alignment members 96 to the engaged position via actuating mechanism 140, as indicated in block 1140. The rotation of alignment member 96 to the engaged position, causes the components of fuel cell stack 20 residing on alignment members 96 to move to the aligned orientation.

If further components are to be added, as indicated in decision block 1150, the alignment members 96 are rotated to the disengaged position via actuating mechanism 140, as indicated in block 1160. If distance $D_3$ cannot accommodate additional components, as indicated in block 1170, alignment members 96 are moved axially relative to the components of fuel cell stack 20 by lowering fixture 132. As distance $D_1$ decreases, distance $D_3$ increases. Once $D_3$ is at a sufficient magnitude, movement of fixture 132 ceases and additional components are added, as indicated in block 1130 and as described above. The assembly process indicated by blocks 1130, 1140, 1150, 1160 and 1170 continues until the desired number of components have been added to fuel cell stack 20.

Once the desired number of components have been added to fuel cell stack 20, as indicated in block 1150, the final assembly of fuel cell stack 20 according to the methods of the present invention may commence. The final assembly is performed in the same manner as described above and as indicated in blocks 1066-1110. Accordingly, the final assembly of the fuel cell stack will not be described further.

Figure 13A:
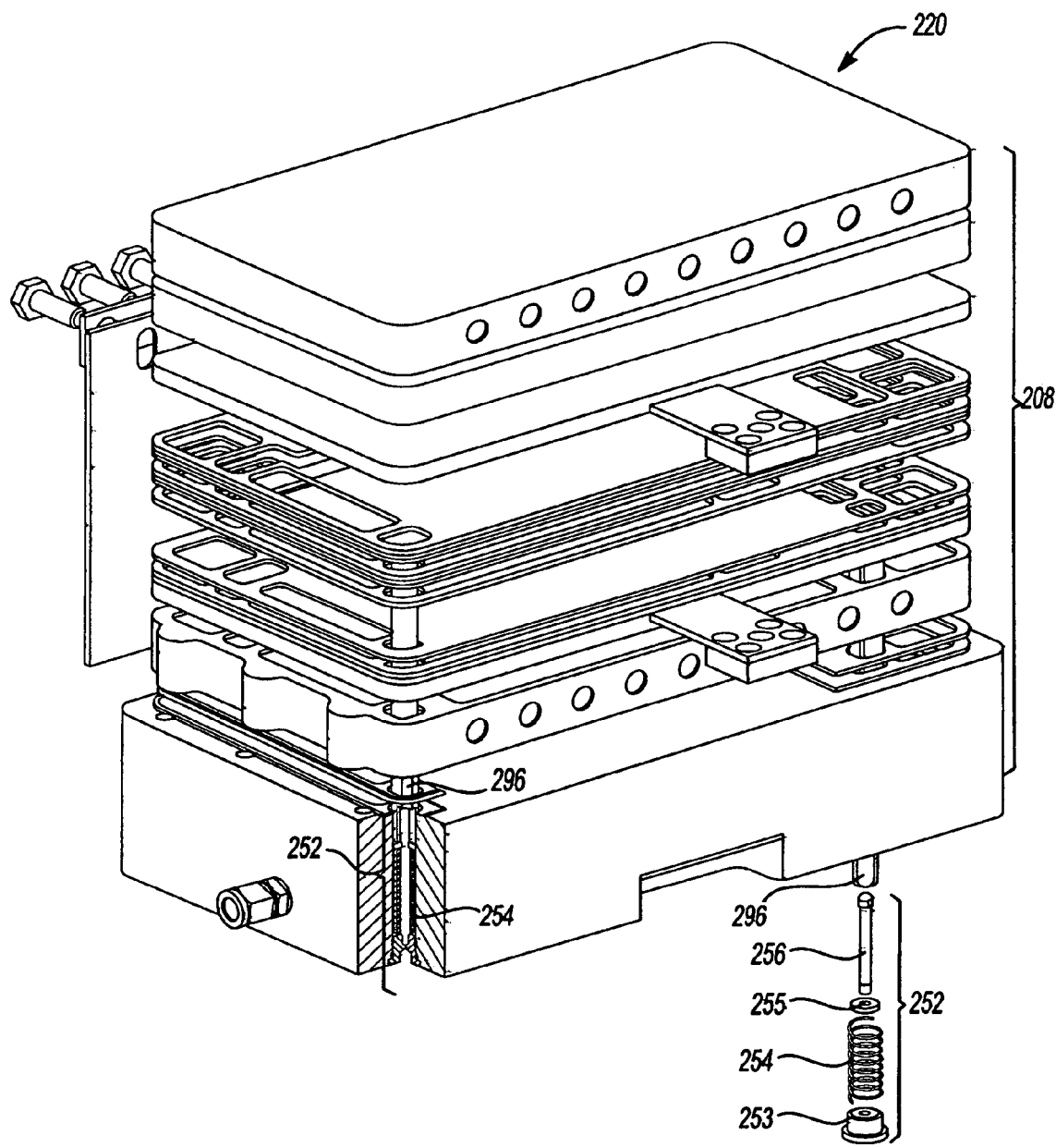
FIG. 13A is an exploded perspective view of a fuel cell stack with two alignment members and two spring mechanisms according to a first alternate embodiment of the present invention with one spring mechanism shown engaged with a fuel cell component and the other spring mechanism shown in an exploded view.
Figures 13B, 14:
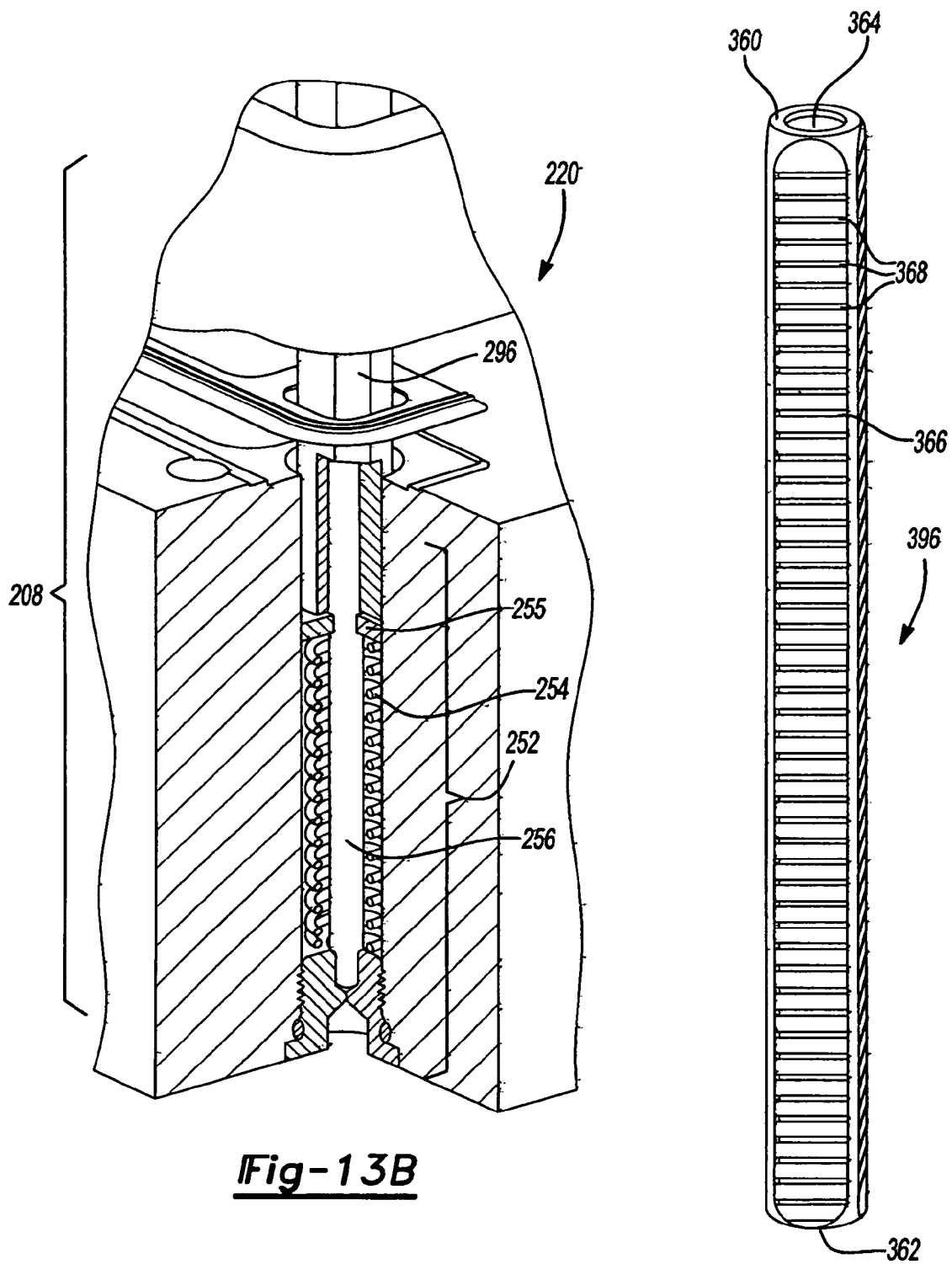
FIG. 13B is an enlarged partial cutaway view of the spring mechanism engaged with the fuel cell component of FIG. 13A according to the first alternate embodiment of the present invention.
FIG. 14 is a perspective view of an alignment member with an internal fluid passageway and apertures through the outside surface according to a second alternate embodiment of the present invention.

As stated above, a first alternate embodiment of the present invention, as shown in FIGS. 13A and 13B, includes a spring mechanism 252 that is used in conjunction with the alignment members 296 to align the components of fuel cell stack 220. The use of a spring mechanism 252 in conjunction with alignment member 296 is typically employed in a fuel cell stack 220 having a shorter length and/or fewer fuel cells therein. FIG. 13A shows an exploded view of fuel cell stack 220. Fuel cell stack 220 is comprised of a plurality of components 208, two alignment members 296, and two corresponding spring mechanisms 252. One spring mechanism 252 is shown coupled to a component 208 while the other spring mechanism 252 is shown in an exploded view. Each spring mechanism 252 includes an end cap 253, a spring member 254, a washer 255 and an extension pin 256. Extension pin 256 extends from end cap 253 into a lower portion of alignment member 296. Spring member 254 compresses to allow for movement of alignment members 296 relative to components 208. FIG. 13B shows an enlarged view, of spring mechanism 252 engaged with fuel cell stack 220 and alignment member 296.

The assembly of fuel cell stack 220 using spring mechanism 252 in conjunction with alignment members 296 according to the methods of the present invention is shown in FIGS. 17A-17C. When spring-mechanism 252 is used in conjunction with alignment members 296 to assemble fuel cell stack 220, as, indicated in block 1000, the assembly method, as shown in FIG. 17B, differs from that discussed above when not utilizing a spring mechanism.

As with the previous method discussed above, components of fuel cell stack 220 can be assembled while alignment members 296 are in an engaged or disengaged position, as indicated in decision block 1180. Preferably, components of fuel cell stack 220 are added while alignment members 296 are in the engaged position. In this case, alignment members 296 are rotated to the engaged position by actuator mechanisms 140, as indicated in block 1190. The components of fuel cell stack 220 are assembled together by sliding the various component(s) (either singularly or in generally-aligned groups) along the length of alignment members 296. Because alignment members 296 are in the engaged position, as each component is added, the component will orient itself to a desired position that aligns it relative to the other components.

As stated above, spring mechanism 252 and alignment members 296 are typically associated with shorter fuel cell stacks. Accordingly, alignment members 296 will not be moved axially relative to the components of fuel cell stack during the assembly. Rather, each component of fuel cell stack 220 will be sequentially added, either individually or in groups, until all of the components have been positioned on alignment member 296 and aligned relative to one another. Once all of the components have been added, final assembly of the fuel cell stack according to the methods of the present invention can be commenced.

The final assembly of fuel cell stack 220 is substantially the same as that discussed above with reference to blocks 1066-1110 and the single-phase compression regime. The two-phase compression regime is not utilized when a spring mechanism 252 is associated with an alignment member 296. During the compression of fuel cell stack 220, spring mechanism 252 enables alignment members 296 to be moved axially with the compression of the components of fuel cell stack 220 due to the compression of spring member 254. This axial movement of alignment member 296 results in a limited relative axial movement between the components of fuel cell stack 220 that are being aligned by alignment member 296 during the compression of fuel cell stack 220. Furthermore, by allowing alignment member 296 to move axially, apertures that extend through the uppermost components of fuel cell stack 220 and components of assembly mechanism 130 are not needed as alignment members 296 are compressed axially into the lower end components of fuel cell stack 220. Thus, the final assembly of fuel cell stack 220 is then substantially the same as that discussed above with reference to blocks 1066-1110 and the single-phase compression regime. Accordingly, the final assembly of the fuel cell stack will not be described further.

As stated above, fuel cell stack 220 can be assembled with alignment members 296 in a disengaged position, as indicated in decision block 1180. In this case, alignment members 296 are rotated to a disengaged position via actuator mechanism 140, as indicated in block 1210. With alignment members 296 in a disengaged position, one or more components, either singularly or in generally-aligned groups, of fuel cell stack 220 are slid along alignment members 296, generally in the desired aligned orientation. Alignment member 296 will be capable of aligning a certain number of unaligned components when rotated from the disengaged position to the engaged position. Accordingly, components may continue to be added to alignment member 296 up until the capabilities of alignment member 296 are met.

The components are aligned by rotating alignment members 296 to the engaged position, as indicated in block 1230. This is accomplished by actuating mechanism 140. If additional components need to be added, as indicated in decision block 1240, alignment members 296 are rotated to the disengaged position by actuating mechanism 140, as indicated in block 1210. The additional component(s) can then be added.

The process of adding and aligning components, as indicated in blocks 1210, 1220, 1230 and 1240 continues until all of the components of fuel cell stack 220 have been assembled and oriented into their aligned positions. With all of the components assembled and aligned, the final assembly of fuel cell stack 220 will commence as discussed above and indicated in blocks 1066-1110. Accordingly, the final assembly of the fuel cell stack will not be discussed further.

Referring now to FIG. 14, a second alternate embodiment of an alignment member according to the principles of the present invention is shown. Alignment member 396 is designed to remain in the fuel cell stack and is configured to be used in an alignment feature that forms a portion of a fluid header, such as alignment feature 110 shown in FIG. 8. Alignment member 396 remains within that portion of the fluid header after the fuel cell stack has been assembled and during use of the fuel cell stack. Because alignment member 396 remains within the alignment feature that forms a portion of a fluid header, alignment member 396 is designed to have a minimum impact on the flow of the fluid through both that header and the alignment feature that forms a portion of that header. Accordingly, alignment member 396 includes ends 360, 362 and an internal fluid passageway 364 that extends therebetween. The external surface 366 of alignment member 396 includes a plurality of apertures 368 that are in fluid communication with internal fluid passageway 364.

When a fluid is flowing through the header and the alignment feature, the fluid can flow around the outside of alignment member 396, through passageway 364, and flow therebetween via apertures 368. Thus, alignment member 396 allows for fluid flowing through the alignment feature of the header to reach the necessary components of the fuel cell stack. Furthermore, alignment member 396 preferably is non-conductive or has a non-conductive coating so as to not interfere with the electric current flow through the fuel cell stack. Alignment member 396 is preferably maintained in the engaged position with the alignment features when it is left within the fuel cell stack. By maintaining alignment member 396 in the engaged position, alignment member 396 adds additional rigidity and stability to the components of the fuel cells and to the fuel cell stack as a whole. Moreover, by maintaining alignment member 396 in the engaged position, relative movement of the various components of the fuel cell stack is further inhibited.

The method of assembling a fuel cell stack with alignment members 396 is the same as that discussed above with reference to the preferred embodiment with the alignment member remaining with the fuel cell stack after assembly. Accordingly, assembly of a fuel cell stack using alignment members 396 will not be discussed further.

Figure 15A:
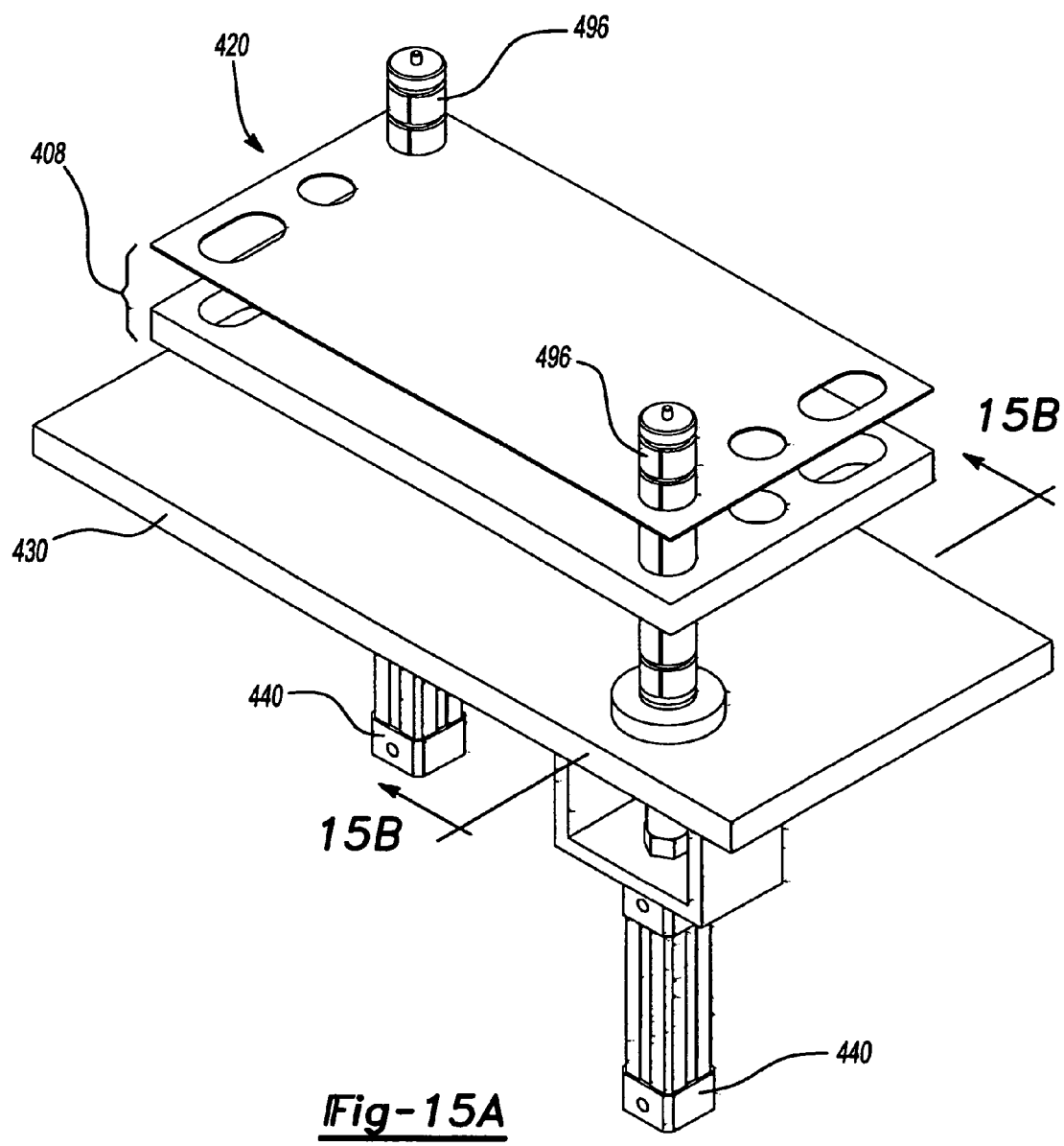
FIG. 15A is an exploded perspective view of an assembly mechanism including radially expanding alignment members according to a third alternate embodiment of the present invention.

A third alternate embodiment of the present invention is shown in FIGS. 15 and 16. FIG. 15A shows an exploded view of partially assembled fuel cell stack 420 on assembly base 430. Fuel cell stack 420 comprises components 408, which are disposed around alignment members 496. Alignment members 496 move between engaged and disengaged positions with respect to components 408 by radially expanding and contracting, as described in more detail below.

Figure 15B:
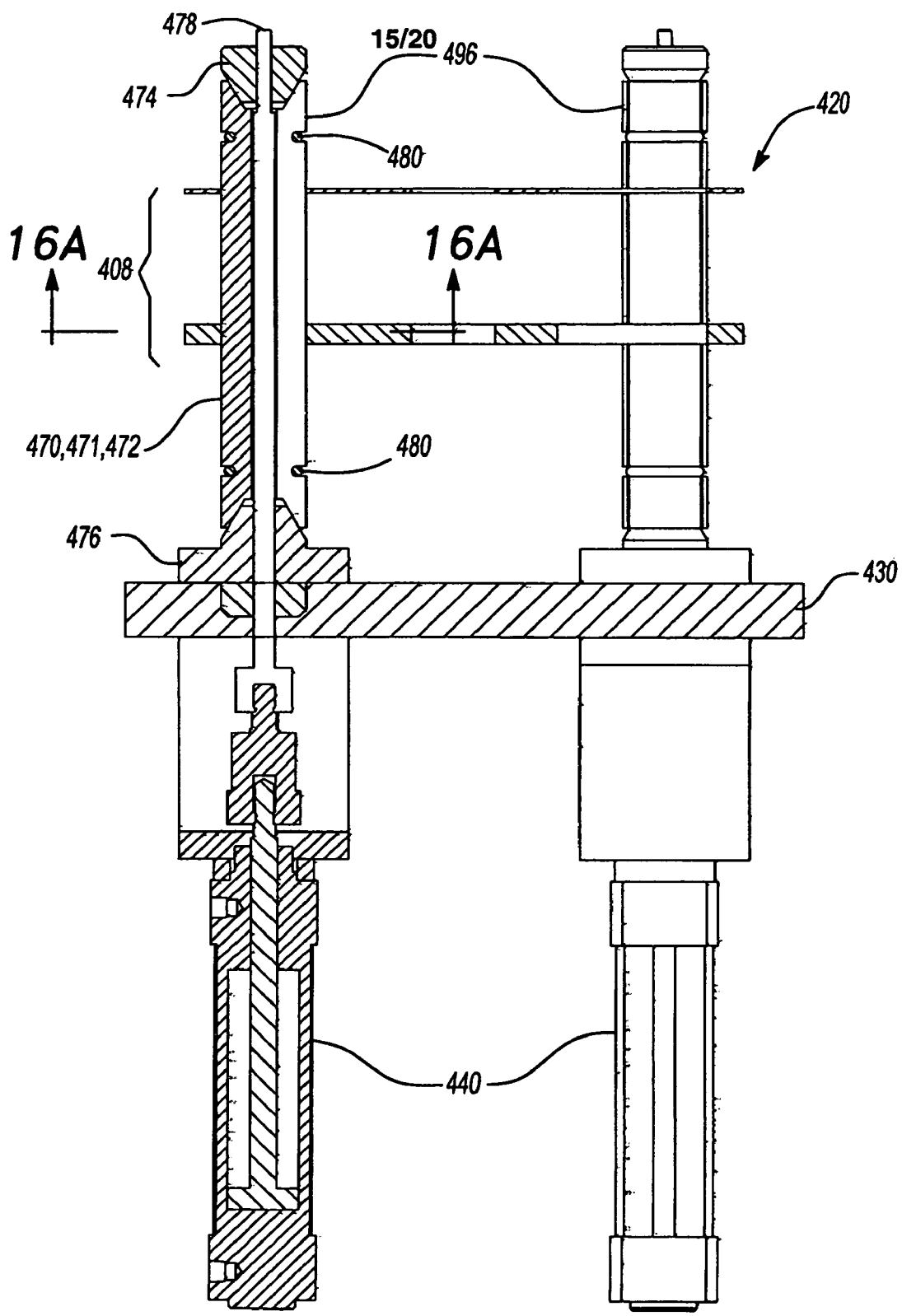
FIG. 15B is a cross-sectional view of the assembly mechanism, along line 15B-15B of FIG. 15A.

Referring to FIG. 15B, alignment members 496 are shown in detail. Each radially expanding and contracting alignment member 496 includes three complementary members 470, 471 and 472 which provide tapered, internal recesses at each end and an axially extending internal channel. The tapered portions of members 470, 471 and 472 interact with wedges 474 and 476. Wedge 474 includes a tapering exterior portion which engages the tapered recess formed by members 470, 471 and 472 and is moveable relative to wedge 476 to provide for the radial expansion and contraction of alignment member 496. Expansion corresponds to the engaged position while retraction corresponds to the disengaged position. Stationary wedge 476 is fixed to assembly base 430 and also includes a tapered exterior portion which engages the opposite tapered recess formed by members 470, 471 and 472.

Alignment member 496 includes an axially moveable rod 478. Rod 478 is located in the internal channel between complementary members 470, 471 and 472 and is fixed to moveable wedge 474. Rod 470 is capable of moving axially relative to complementary members 470, 471 and 472 and stationary wedge 476. An actuator 440 is coupled to rod 478 and is operable to move rod 478 axially. Movement of rod 478 relative to fixed wedge 476 causes moveable wedge 474 to move toward or away from stationary wedge 476 to cause radial expansion or contraction of alignment member 496.

Alignment member 496 also includes upper and lower biasing members 480 that bias members 470, 471 and 472 radially inwardly. Thus, when moveable wedge 474 is pulled toward stationary wedge 476, the engagement of the tapered surfaces on wedges 474, 476 with the tapered recesses formed by members 470, 471 and 472 cause members 470, 471 and 472 to move radially outwardly to the engaged position against the biasing of biasing members 480. On the other hand, movement of moveable wedge 474 away from stationary wedge 476 allows the force of biasing members 480 to move members 470, 471 and 472 radially inwardly to the disengaged position.

Figure 16A:
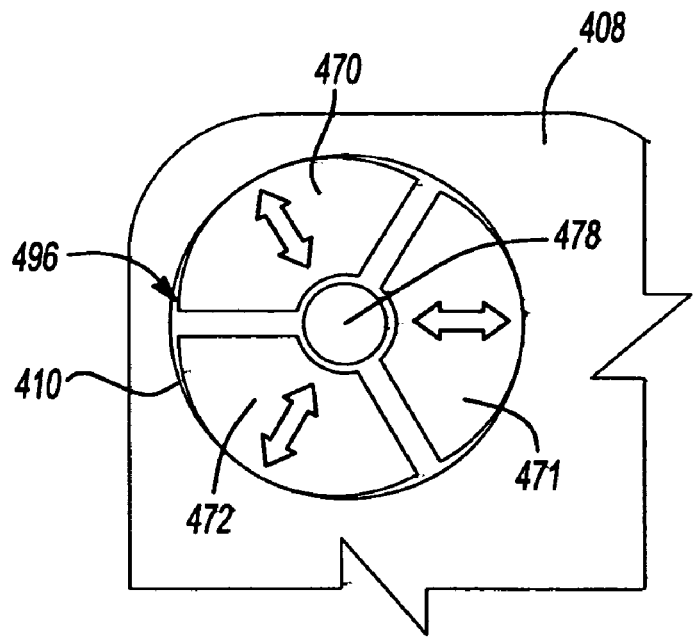
FIGS. 16A and 16B are plan views of a radially expanding alignment member of FIG. 15A respectively engaged and disengaged with the corresponding alignment feature of a component of a fuel cell stack according to the principles of the present invention.
Figure 16B:
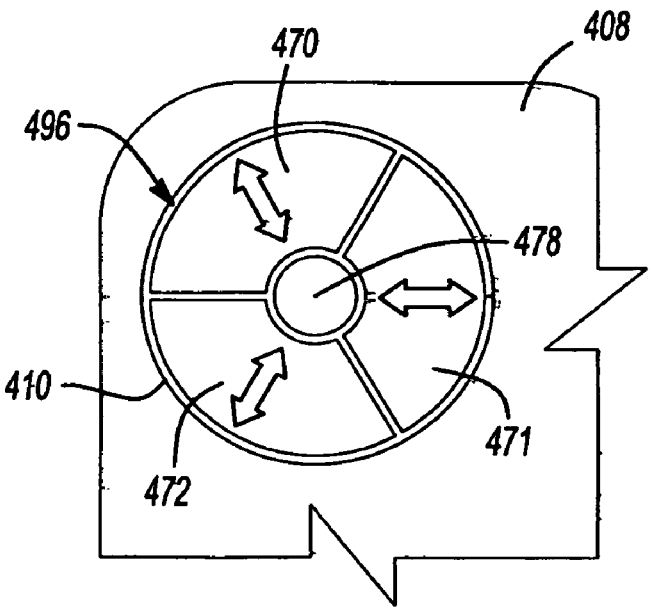

FIGS. 16A and 16B show alignment member 496 respectively engaged and disengaged with component 408 having internal alignment feature 410. It is to be understood that the relative scaling of FIGS. 16A and 16B has been exaggerated for illustrative purposes. Referring to FIG. 16A, members 470, 471 and 472 are shown radially expanded and in the engaged position. In the engaged position, each member 47G, 471 and 472 has at least one point or area of interaction with internal alignment feature 410 of component 408 thus providing at least three points or areas of contact for each alignment member 496. Referring to FIG. 16B, members 470, 471 and 472 are shown radially retracted and disengaged from component 408 and thus have no interactions with internal alignment feature 410.

Assembly of a fuel cell stack utilizing alignment members 496 is substantially the same as that discussed above with reference to alignment member 96 with the main difference being the manner in which alignment members 496 move between an engaged and disengaged position with components of the fuel cell stack. Accordingly, assembly of a fuel cell stack using alignment members 496 is not discussed further.

It is to be understood that the present invention can vary from the specific features and functionality shown and described. The plates included in the fuel cell stack can be made of a variety of materials and have a variety of constructions. For example, composite and stainless steel plates may be used, and the plates may have stamped, etched, molded, or machined constructions. The shapes of alignment members and internal alignment features can vary further than the several embodiments shown herein. The configuration of an assembly mechanism for the present invention, the size of the fuel cell stack of the present invention, and the number and type of alignment members may also vary. Additionally, variations may occur in the methods of assembly. Thus, the description of the invention is merely exemplary in nature and variations that do not depart from the gist of the invention are intended to be within the scope of the invention. Such variations are not to be regarded as a departure from the spirit and scope of the invention.

What is claimed is:

1. An alignment system for a fuel cell stack having a plurality of components with internal alignment features, the alignment system comprising:
   a fixture operable to support components of a fuel cell stack; and
   at least one alignment member selectively operable between first and second rotated positions with respect to a longitudinal axis of said alignment member, said alignment member configured to interact with internal alignment features on components of a fuel cell stack, said first rotated position corresponding to being engaged with alignment features of at least two of said components, said second rotated position corresponding to said alignment member being disengaged from said alignment features.

2. The alignment system of claim 1, wherein said alignment member has an exterior surface and portions of said exterior surface engage with said alignment features when in said first position.

3. The alignment system of claim 2, wherein said exterior surface has a geometry that causes multiple distinct points of contact with said alignment feature when in said first position.

4. The alignment system of claim 2, wherein an engaging portion of said alignment member is substantially square in cross section.

5. The alignment system of claim 2, wherein an engaging portion of said alignment member is substantially triangular in cross section.

6. The alignment system of claim 2, wherein an engaging portion of said alignment member is substantially octagonal in cross section.

7. The alignment system of claim 1, wherein said alignment member is configured to remain in said fuel cell stack after assembly.

8. The alignment system of claim 7, wherein said alignment member has an internal fluid passageway and an exterior surface with a plurality of apertures communicating with said passageway thereby enabling a fluid to pass between said passageway and an exterior of said alignment member.

9. The alignment system of claim 1, further comprising a powered actuator operable to move said alignment member between said first and second positions.

10. The alignment system of claim 1, wherein a radial dimension of said alignment member changes as said alignment member moves between said first and second positions.

11. The alignment member of claim 1, wherein components of a fuel cell stack can move axially relative to the alignment member when said alignment member is in said first position.

12. The alignment system of claim 1, further comprising a spring member coupled to said alignment member and said alignment member moves axially when components of a fuel cell stack are being axially compressed together.

13. The alignment system of claim 1, wherein movement of said alignment member from said second position to said first position causes components of a fuel cell stack to move to a predetermined orientation relative to one another.

14. The alignment system of claim 1, wherein said alignment member is selectively positionable in intermediate positions between said first and second positions to provide varying degrees of engagement between said alignment members and said internal alignment features.

15. An alignment system for a fuel cell stack having components with internal alignment features, the alignment system comprising:
   a first component having a first alignment feature;
   a second component having a second alignment feature; and
   an alignment member concurrently received through both the first and second alignment features of the first and second components and positionable in each of a first and a second position:
      the first position of the alignment member having the alignment member disengaged from contact with both the first and second alignment features; and
      the second position of the alignment member achieved by rotation with respect to a longitudinal axis of the alignment member resulting in the alignment member being simultaneously engaged with both the first and second alignment features acting to align the first and second alignment features and thereby the first and second components.

16. The alignment system of claim 15, further including:
   a third alignment feature created in the first component;
   a fourth alignment feature created in the second component; and
   a second alignment member inserted through both the third and fourth alignment features also positionable in each of the first and second positions.

17. The alignment system of claim 16, further including at least five total points of interaction between the first and second alignment members and the alignment features in the first position of the alignment members to align the first and second components.

18. The alignment system of claim 16, wherein the first and second alignment members are substantially square and provide six points of interaction between the first and second alignment members and the alignment features in the first position of the alignment members, and wherein the first alignment member interacts with square-shaped alignment features of the first component providing four of the six points of interaction, and the second alignment member interacts with rectangular-shaped alignment features of the second component to provide two of the six points of interaction.

* * * * *